United States Patent
Van Thiel et al.

(10) Patent No.: US 12,420,761 B2
(45) Date of Patent: Sep. 23, 2025

(54) PARKING BRAKE ASSEMBLY WITH ABS CONTROL FOR EACH INDIVIDUAL WHEEL

(71) Applicant: ZF CV Systems Hannover GmbH, Hannover (DE)

(72) Inventors: Julian Van Thiel, Grossburgwedel (DE); Uwe Bensch, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 1078 days.

(21) Appl. No.: 17/430,327

(22) PCT Filed: Feb. 6, 2020

(86) PCT No.: PCT/EP2020/052928
§ 371 (c)(1),
(2) Date: Aug. 12, 2021

(87) PCT Pub. No.: WO2020/165008
PCT Pub. Date: Aug. 20, 2020

(65) Prior Publication Data
US 2022/0144235 A1    May 12, 2022

(30) Foreign Application Priority Data
Feb. 15, 2019 (DE) ..................... 10 2019 103 901.0

(51) Int. Cl.
*B60T 13/68* (2006.01)
*B60T 8/176* (2006.01)
(Continued)

(52) U.S. Cl.
CPC ............ *B60T 13/683* (2013.01); *B60T 8/176* (2013.01); *B60T 15/027* (2013.01);
(Continued)

(58) Field of Classification Search
CPC .................................................. B60T 2201/12
See application file for complete search history.

(56) References Cited

U.S. PATENT DOCUMENTS

| 2008/0309154 A1 | 12/2008 | Hilberer |
| 2009/0189438 A1 | 7/2009 | Beier et al. |

(Continued)

FOREIGN PATENT DOCUMENTS

| CN | 101495350 A | * | 7/2009 | ............ B60T 13/683 |
| CN | 103754211 A | * | 4/2014 | |

(Continued)

*Primary Examiner* — Melody M Burch
(74) *Attorney, Agent, or Firm* — LEYDIG, VOIT & MAYER, LTD.

(57) ABSTRACT

A parking brake assembly for an electronically controllable pneumatic braking system for a vehicle includes a parking brake unit having a supply connection to receive a supply pressure, a brake request connection to receive a parking brake request, and a parking brake pressure connection to provide a parking brake pressure. The parking brake assembly further includes a first ABS valve unit for a first channel and a second ABS valve unit for a second channel. The first ABS valve unit is configured to provide a pressure for a first spring-loaded brake cylinder at the first channel and to admit air to the first channel, in stages. The second ABS valve unit is configured to provide a second brake pressure for at least one second spring-loaded brake cylinder at the second channel and to admit air to the second channel, in stages.

20 Claims, 10 Drawing Sheets

(51) Int. Cl.
*B60T 15/02* (2006.01)
*B60T 17/08* (2006.01)

(52) U.S. Cl.
CPC ......... *B60T 17/083* (2013.01); *B60T 2201/12* (2013.01); *B60T 2270/10* (2013.01)

(56) References Cited

U.S. PATENT DOCUMENTS

| | | |
|---|---|---|
| 2009/0280959 A1 | 11/2009 | Bensch et al. |
| 2011/0012421 A1 | 1/2011 | Bensch et al. |
| 2018/0003306 A1* | 1/2018 | Bonanno ............. F16K 31/0672 |

FOREIGN PATENT DOCUMENTS

| | | | | |
|---|---|---|---|---|
| CN | 203920726 U | * | 11/2014 | |
| CN | 105905087 A | | 8/2016 | |
| CN | 206344798 U | * | 7/2017 | |
| CN | 107512259 A | * | 12/2017 | |
| CN | 108501920 A | * | 9/2018 | ............. B60T 13/26 |
| DE | 19942533 A1 | | 11/2000 | |
| DE | 102005043608 A1 | | 3/2007 | |
| DE | 102008003380 A1 | | 7/2009 | |
| DE | 102008009882 A1 | | 8/2009 | |
| DE | 102014006613 A1 | | 11/2015 | |
| EP | 0995659 A1 | | 4/2000 | |
| EP | 2059428 A1 | | 5/2009 | |
| EP | 2108554 A1 | | 10/2009 | |
| GB | 2448007 A | | 10/2008 | |

* cited by examiner

PARKING BRAKE ASSEMBLY WITH ABS CONTROL FOR EACH INDIVIDUAL WHEEL

CROSS REFERENCE TO RELATED APPLICATIONS

This application is a U.S. National Phase application under 35 U.S.C. § 371 of International Application No. PCT/EP2020/052928, filed on Feb. 6, 2020, and claims benefit to German Patent Application No. DE 10 2019 103 901.0, filed on Feb. 15, 2019. The International Application was published in German on Aug. 20, 2020 as WO 2020/165008 A1 under PCT Article 21(2).

FIELD

The present disclosure relates to a parking brake assembly for an electronically controllable pneumatic braking system for a vehicle, in particular a commercial vehicle, with a parking brake unit, which has a supply connection, for receiving a supply pressure, a brake request connection, for receiving a parking brake request, and a parking brake pressure connection, for providing a parking brake pressure.

The present disclosure also relates to an electronically controllable pneumatic braking system, having such a parking brake assembly, and to a method for controlling the electronically controllable pneumatic braking system.

BACKGROUND

Parking brake assemblies are used in vehicles, in particular commercial vehicles, for leaving them in a parked state. Usually, such parking brake assembly act on spring-loaded brake cylinders of so-called spring-loaded brakes or spring-type actuator parts of combined brake cylinders, which are usually attached to a rear axle of a commercial vehicle. The spring-loaded brake cylinders of such spring-loaded brakes or spring-type actuator parts have the property that they are released in the air-admitted state and applied in the air-extracted state, on account of the force of a spring, and thus brake the vehicle. In the usual driving mode, therefore, a spring-loaded brake pressure must be modulated in order to release the spring-loaded brake cylinders. For parking the vehicle, the driver of the vehicle then actuates a corresponding parking brake switch or parking brake lever, which either acts purely pneumatically and extracts air from the spring-loaded brake cylinders pneumatically and mechanically, or an electrical parking brake switch, which sends a corresponding signal to a parking brake module of the parking brake assembly, which then, on the basis of the reception of the electrical signal, switches one or more electromagnetic valves, which then lead to the extraction of air from the spring-loaded brake cylinders.

Apart from this main function of parking brake assemblies, parking brake assemblies are however also used by drivers for secondary braking, for example if the regular service braking system has a fault. In such a case, drivers can briefly actuate the parking brake switch manually, in order to provide braking of the corresponding axles.

In addition, there are systems in which the parking brake assembly can assume a redundancy mode automatically or under the control of a further module. Also in such a case, the spring-loaded brake cylinders are then activated by way of the parking brake assembly in order to redundantly brake the corresponding axle, or axles.

In particular in service brake systems for high levels of automation, it is desirable to provide at least rudimentary traction-slip control on the spring-loaded brake cylinders, in order to ensure operation that is as fault-tolerant as possible. In particular, traction-slip control for each individual wheel would be desirable here for the redundancy mode.

DE 199 42 533 A1 proposes a parking brake device for vehicles, in particular for compressed-air braked commercial vehicles, with an actuating element for actuating wheel braking devices. This parking brake device has an anti-lock control device of the parking brake which, dependent on the rotational speed, sensed by a sensor means, of the wheels to be acted on by the wheel braking device with a parking brake force, activates the wheel braking device in such a way that locking of the wheels is prevented. For this purpose, a separate 3/2-way valve is arranged between a parking brake valve and the corresponding spring-loaded brake cylinder, or the spring-loaded brake pressure is directed by way of the ABS valves, modified for this purpose, that are provided for the corresponding brakes.

Furthermore, EP 2 059 428 A1 discloses a pneumatic braking system for a vehicle with brake cylinders which can be actuated with compressed air for actuating wheel brakes, wherein a first group of wheel brakes belongs to a first brake circuit with a first compressed-air storage tank for providing a first supply pressure and a second group of wheel brakes belongs to a second brake circuit with a second compressed-air storage tank for providing a second supply pressure. At least one brake cylinder of the first brake circuit is designed as a combined spring-loaded/diaphragm cylinder with a spring-type actuator part for providing a parking brake and a diaphragm part for providing a service brake, wherein, in the event of a failure of the first brake circuit, air can be extracted from the spring-type actuator part in order to engage the parking brake. Furthermore, a first pressure sensor for measuring the first supply pressure is provided and is connected to an electronic control unit, by means of which a modulator for admitting air to and extracting air from the spring-type actuator part can be controlled. The control unit is designed to generate an electrical control signal for an electrically actuable solenoid valve of the modulator when the value measured by the first pressure sensor falls below a certain predetermined minimum pressure, wherein admission of air to or extraction of air from the spring-type actuator part is possible indirectly or directly by means of the solenoid valve.

In addition, EP 2 108 554 A1 discloses a braking system of a commercial vehicle with a parking brake comprising parking brake actuators and with a service brake, wherein, in the event of a defect of the service brake, the parking brake assists braking of the commercial vehicle, wherein the parking brake comprises an electronic control unit which is designed for carrying out an ABS control loop for actuating the parking brake actuators, wherein the parking brake is designed to brake a number of vehicle axles in any desired combinations, wherein only the vehicle axles that are affected by the defect of the service brake are braked. A disadvantage of this is that it only works sufficiently for electronically controllable braking systems, but cannot be implemented for purely pneumatic braking systems.

SUMMARY

In an embodiment, the present disclosure provides a parking brake assembly for an electronically controllable pneumatic braking system for a vehicle. The parking brake assembly includes a parking brake unit having a supply connection configured to receive a supply pressure, a brake request connection configured to receive a parking brake request, and a parking brake pressure connection configured to provide a parking brake pressure. The parking brake assembly further includes an ABS valve assembly having a first ABS valve unit for a first channel and a second ABS valve unit for a second channel. The first ABS valve unit is configured to receive the parking brake pressure and to provide a first brake pressure for at least one first spring-loaded brake cylinder at the first channel. The first ABS valve unit is designed to admit air to the first channel, in stages, in dependence on a received first ABS signal. The second ABS valve unit is configured to receive the parking brake pressure and to provide a second brake pressure for at least one second spring-loaded brake cylinder at the second channel. The second ABS valve unit is designed to admit air to the second channel, in stages, in dependence on a received second ABS signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
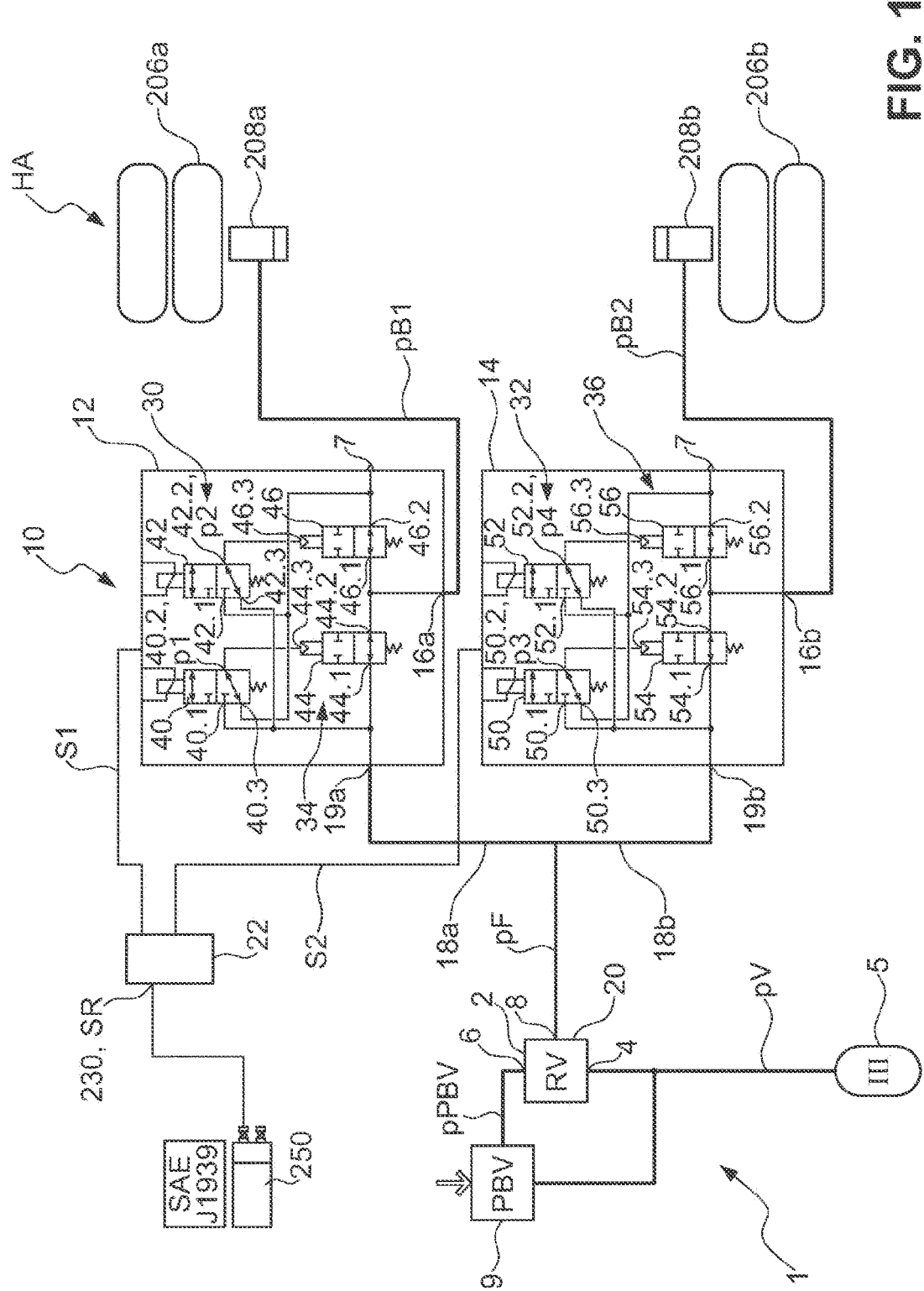
FIG. 1 shows a first exemplary embodiment of a parking brake assembly.

The present disclosure provides a parking brake assembly in which traction-slip control of parking brakes is provided.

According to a first aspect, a parking brake assembly has in addition to a parking brake unit an ABS valve assembly, which has a first ABS valve unit for a first channel and a second ABS valve unit for a second channel, wherein the first ABS valve unit receives the parking brake pressure from the parking brake unit and provides a first brake pressure for at least one first spring-loaded brake cylinder at the first channel, wherein the first ABS valve unit is designed to admit air to the first channel, at least in stages, in dependence on a received first ABS signal, and wherein the second ABS valve unit receives the parking brake pressure from the parking brake unit and provides a second brake pressure for at least one second spring-loaded brake cylinder at the second channel, wherein the second ABS valve unit is designed to admit air to the second channel, at least in stages, in dependence on a received second ABS signal.

The disclosure is based on the finding that, on the basis of a single-channel parking brake unit such as is known in principle in the prior art, an at least two-channel traction-strip-controlled modulation of pressures for spring-loaded brake cylinders can be realized by providing first and second ABS valve units which are connected to the parking brake unit and provide the corresponding pressure at spring-loaded brake cylinders. In this case, it may be provided that the first channel is assigned for example to the rear axle, and the second channel is assigned to the front axle. Also, assignment of channels for each individual wheel may also take place. In this way, the first and second brake pressures may be independent of one another.

Preferably, the ABS valve units are designed as inverse ABS valve units. Preferably, the ABS valve units are open in the normal driving mode and when there is no current, so that the parking brake pressure provided by the parking brake unit is allowed to pass through by the first and second ABS valve units and is provided at the corresponding first and second channels. Preferably, the first and second ABS valve units also allow extraction of air in stages. The parking brake unit is a single-channel unit and the parking brake pressure connection may open out either at a single connection, or else at two separate connections, for the first and second ABS valve units.

According to a first preferred embodiment, the parking brake unit has a relay valve, for receiving the supply pressure and a parking brake control pressure, wherein the relay valve modulates the parking brake pressure in the parking brake pressure connection in dependence on the parking brake control pressure. This variant therefore concerns a pneumatically acting parking brake unit which provides the parking brake pressure on the basis of a control pressure, to be specific the parking brake control pressure. Such a parking brake unit can be actuated in particular by way of a parking brake valve such as that which in North American variants is for example often situated in the driver's cab of the vehicle.

It is also preferred that the parking brake assembly in a preferred embodiment has an ABS control unit for providing at least the first and second ABS signal at the first and second ABS valve units. This ABS control unit may in principle be integrated with any model suitable for it or be designed as an independent module. For example, the ABS control unit may be integrated with one of the two ABS valve units, or else with the parking brake unit. It is also conceivable that the ABS control unit is integrated with a central module and is for example only formed on it as a software module. The first and second ABS signals for the first and second ABS valve units are preferably provided independently of one another and by way of separate channels. They are preferably provided for the purpose of causing switching of at least one solenoid valve respectively in the first and second ABS valve unit.

In a variant, the parking brake unit is designed as an electropneumatic parking brake module with an EPH control unit integrated therein, an EPH precontrol valve unit and an EPH main valve unit. The EPH control unit controls in a known way the EPH precontrol valve unit, which has at least one electromagnetically effective switching valve. The EPH precontrol valve unit on this basis provides at least one control pressure at the EPH main valve unit, which then, on the basis of the reception of this control pressure, provides the parking brake pressure at the parking brake pressure connection directly or in a volume-increased manner. In principle, such an electropneumatic parking brake module may be designed in any suitable way.

In this embodiment it is preferably provided that the EPH control unit provides the first and second ABS signals at the first and second ABS valve units. In this embodiment, the EPH control unit consequently preferably assumes the task of the ABS control unit, or is integrated with it. For this purpose, the EPH control unit may also receive further signals, such as in particular signals from wheel speed sensors, signals of a central module and/or signals of a unit for autonomous driving.

Preferably, the first ABS valve unit comprises a first ABS switching valve and the second ABS valve unit comprises a second ABS switching valve. Such first and second ABS switching valves may for example be connected directly between the parking brake pressure connection and the corresponding spring-loaded brake cylinder.

Preferably, the first ABS switching valve has a first ABS switching valve connection, receiving the parking brake pressure, and a second ABS switching valve connection, modulating the first brake pressure, and the second ABS switching valve has a third ABS switching valve connection, receiving the parking brake pressure, and a fourth ABS switching valve connection, modulating the second brake pressure, wherein both the first and the second ABS switching valve are without current in an open switching position. This means that, without current, the parking brake pressure can be allowed to pass through by the first and second ABS switching valves, in order in this way to be modulated directly into the first and the second channel, which are formed here by the second ABS switching valve connection and the fourth ABS switching valve connection. When the first and second ABS switching valves are then closed after an extraction of air from the spring-loaded brake cylinders, a staged admission of air, and consequently a staged release of the first and/or second spring-loaded brake cylinders can be achieved if there is corresponding provision of the parking brake pressure, by pulsed opening of these first and second ABS switching valves.

The corresponding switching signals for switching the first and second ABS switching valves may in this embodiment be provided both by the EPH control unit and by the ABS control unit if a separate ABS control unit is provided.

In a preferred development, the first ABS valve unit has a first ABS precontrol unit, for modulating a first and a second control pressure, and a first ABS main valve unit, and the second ABS valve unit has a second ABS precontrol unit, for modulating a third and a fourth control pressure, and a second ABS main valve unit. The control pressures are then preferably received by the respective ABS main valve units. In this variant, therefore, instead of the first and second ABS switching valves, more complex circuits are provided, such as are also provided in particular in customary ABS valves, wherein in the present case the first and second ABS valve units are preferably inversely designed, in order in this way to be able to admit air in stages to the inversely acting spring-loaded brake cylinders. In this embodiment, the first and second ABS precontrol units preferably receive the first and second ABS signals, either from the ABS control unit or from the EPH control unit if the ABS control unit is integrated in it.

Here it may preferably be provided that the first ABS precontrol unit has a first inlet precontrol valve, for modulating the first control pressure, and a first outlet precontrol valve, for modulating the second control pressure, and the second ABS precontrol unit has a second inlet precontrol valve, for modulating the third control pressure, and a second outlet precontrol valve, for modulating the fourth control pressure. The first ABS main valve unit preferably also has a first pneumatically switchable inlet main valve for admitting air to the first channel and a first pneumatically switchable outlet main valve for extracting air from the first channel, wherein the first pneumatically switchable inlet main valve has a first control connection, for receiving the first control pressure, and the first pneumatically switchable outlet main valve has a second control connection, for receiving the second control pressure. In a corresponding way, preferably the second ABS main valve unit has a second pneumatically switchable inlet main valve for admitting air to the second channel and a second pneumatically switchable outlet main valve for extracting air from the second channel, wherein the second pneumatically switchable inlet main valve has a third control connection for receiving the third control pressure and the second pneumatically switchable outlet main valve has a fourth control connection, for receiving the fourth control pressure. Formed in this way are complete first and second ABS valve units which, depending on how they are connected up, can also allow a staged extraction of air from the spring-loaded brake cylinders. Thus, in particular the first and second pneumatically switchable outlet main valves could be used for extracting air from the first channel and the second channel if a corresponding parking brake pressure is provided.

In an alternative to this it may be provided that the first ABS main valve unit has a first pneumatically switchable EPH main valve, for modulating the parking brake pressure at the first channel, and a first pneumatically switchable supply main valve, for modulating the supply pressure at the first channel, wherein the first pneumatically switchable EPH main valve has a fifth control connection, for receiving the first control pressure, and the first pneumatically controllable supply main valve has a sixth control connection, for receiving the second control pressure. In a corresponding way, the second ABS main valve unit preferably has a second pneumatically switchable EPH main valve, for modulating the parking brake pressure at the second channel, and a second pneumatically switchable supply main valve, for modulating the supply pressure at the second channel, wherein the second pneumatically switchable EPH main valve has a seventh control connection, for receiving the third control pressure, and the second pneumatically switchable supply main valve has an eighth control connection, for receiving the fourth control pressure. By means of the first and second EPH main valves and supply main valves, therefore, the parking brake pressure provided by the parking brake module or the supply pressure provided by a compressed air supply can be alternately modulated at the first channel or second channel. This makes it possible to achieve a release of the first and second spring-loaded brake cylinders also above the parking brake pressure provided by the parking brake module. If for example only a small parking brake pressure is provided by the parking brake module, because the spring-loaded brake cylinders are intended in principle to be engaged, that is to say for the air to be extracted, a staged release of the spring-loaded brake cylinders can only take place to the degree to which a parking brake pressure is provided by the parking brake unit. If this is not sufficient to achieve a release of the spring-loaded brake cylinder, this is not possible with the previously described embodiment. If, however, according to this embodiment, provision of supply pressure at the first channel and the second channel is made possible independently of the level of the parking brake pressure provided, the spring-loaded brake cylinders can also be released, that is to say have air admitted, in stages if the parking brake pressure provided by the parking brake unit is not sufficient for this. The first and second ABS precontrol units do not have to be modified for this.

Preferably, in this embodiment, the first ABS valve unit has a first ABS supply connection, for receiving the supply pressure, and the second ABS valve unit has a second ABS supply connection, for receiving the supply pressure. The supply pressure is preferably the same that is also fed to the parking brake module, that is to say in particular the supply pressure from a parking brake circuit. Alternatively, it may also be provided that the supply pressure for the first and second ABS valve units is provided from a further compressed air supply.

Furthermore, it is preferred that, if supply pressure is fed to the first and second ABS valve units, the first ABS valve unit has a first ABS shut-off valve for shutting off the first ABS supply connection and the second ABS valve unit has a second ABS shut-off valve for shutting off the second ABS supply connection. In this way, the supply pressure can be excluded, for example whenever sufficient parking brake pressure is provided. The converse case is also conceivable and preferred, that supply pressure is only provided whenever sufficient parking brake pressure is also provided. In this way, the provided supply pressure can then be used to achieve quicker admission of air to the parking brake cylinders, whereby the ability of the parking brake assembly to react is increased significantly.

In a variant, the first and second ABS shut-off valves are designed as pneumatically switchable 2/2-way vales. As an alternative to this, the first and second ABS shut-off valves are designed as pneumatically switchable 3/2-way valves. In this second variant, it may be additionally provided that extraction of air from the first and second channels by way of the respective shut-off valve is also allowed. If appropriate, one of the supply main valves may also be interposed here. In this way, the ability to react during the extraction of air, that is to say engagement, of the spring-loaded brake cylinders can also be increased.

In a variant, it may be provided that the first and second ABS valve units are arranged separately and at a distance from the parking brake unit. As an alternative to this, it may be provided that the first and second ABS valve units are flange-mounted on a housing of the parking brake unit. It may also be provided that the first and second ABS valve units and the parking brake units are integrated on the module. Depending on how the braking system in which the parking brake assembly is to be used is constructed, one of the aforementioned integration stages may be appropriate.

In a second aspect, the disclosure provides an electronically controllable pneumatic braking system for a vehicle, in particular a commercial vehicle, in that it has: a rear axle brake circuit, a front axle brake circuit and a parking brake circuit, wherein the parking brake circuit has first and second spring-loaded brake cylinders and a parking brake assembly according to one of the previously described preferred embodiments of a parking brake assembly according to the first aspect, wherein the first channel is connected to the first spring-loaded brake cylinder and the second channel is connected to the second spring-loaded brake cylinder. It should be understood that the electronically controllable pneumatic braking system according to the second aspect and the parking brake assembly according to the first aspect have identical and similar subaspects. To this extent, for the advantages and particular embodiments of the electronically controllable pneumatic braking system, reference is made to the description of the first aspect in full.

In a first preferred embodiment of the electronically controllable pneumatic braking system, the parking brake assembly is designed such that it has an ABS control unit for providing the first and second ABS signals, or the parking brake assembly is designed as an electropneumatic parking brake module with an EPH control unit, wherein in this case the ABS control unit or EPH control unit has at least one first electronic redundancy connection, for receiving a first redundant electromagnetic brake request. In this way, the parking brake unit can be used in a case of redundancy of the braking system, for example because another model of the braking system such as for example the central module no longer functions, or not correctly, for taking over at least one braking action at the rear axle by way of a redundant activation of spring-loaded brake cylinders. Specifically in such a case, traction-slip control at this redundantly braked axle is of particular advantage.

In a third aspect, the disclosure provides a method for controlling an electronically controllable pneumatic braking system according to the second aspect, with the steps of: providing a first brake pressure and a second brake pressure at first and second spring-loaded brake cylinders of an axle, for releasing these spring-loaded brake cylinders; ascertaining a fault, which at least partially prevents electronically controlled braking of the axle by means of service brake cylinders; providing a redundant electronic brake request signal at the parking brake assembly; and implementing the redundant electronic brake request signal in a traction-slip-controlled manner for each individual wheel with the parking brake assembly at the axle at least by staged extraction of air in a traction-slip-controlled manner from the first and second spring-loaded brake cylinders.

It should be understood that the method according to a third aspect and the parking brake assembly according to the first aspect and also the braking system according to the second aspect have identical and similar subaspects. To this extent, also with respect to the method, reference is made to the description above of the first and second aspects in full.

In a fourth aspect, the disclosure provides a commercial vehicle, with a parking brake assembly according to one of the previously described preferred embodiments of a parking brake assembly according to the first aspect. Preferably, the commercial vehicles also have a braking system according to the second aspect.

Exemplary embodiments are now described below with reference to the drawings. These are not necessarily intended to represent the exemplary embodiments to scale; on the contrary, where useful for explanation, drawings are executed in a schematic and/or slightly distorted form. With regard to additions to the teachings directly recognizable from the drawings, attention is drawn to the relevant prior art. It should be borne in mind here that many modifications and changes relating to the form and detail of an embodiment can be made without departing from the general concept of the disclosure. The features which are disclosed in the description, in the drawings and in the claims may be provided both individually and in any desired combination. Moreover, all combinations of at least two of the features disclosed in the description, in the drawings and/or in the claims fall within the scope of the disclosure. The general concept of the disclosure is not limited to the exact form or detail of the preferred embodiments shown and described below, nor is it limited to subject matter which would be restricted in comparison with the subject matter claimed in the claims. In the case of specified dimensioning ranges, the intention is also to disclose values lying within the limits mentioned as limit values and to allow for them to be used in any way. For the sake of simplicity, identical or similar parts or parts with identical or similar functions are provided below with the same reference signs.

Figure 7:
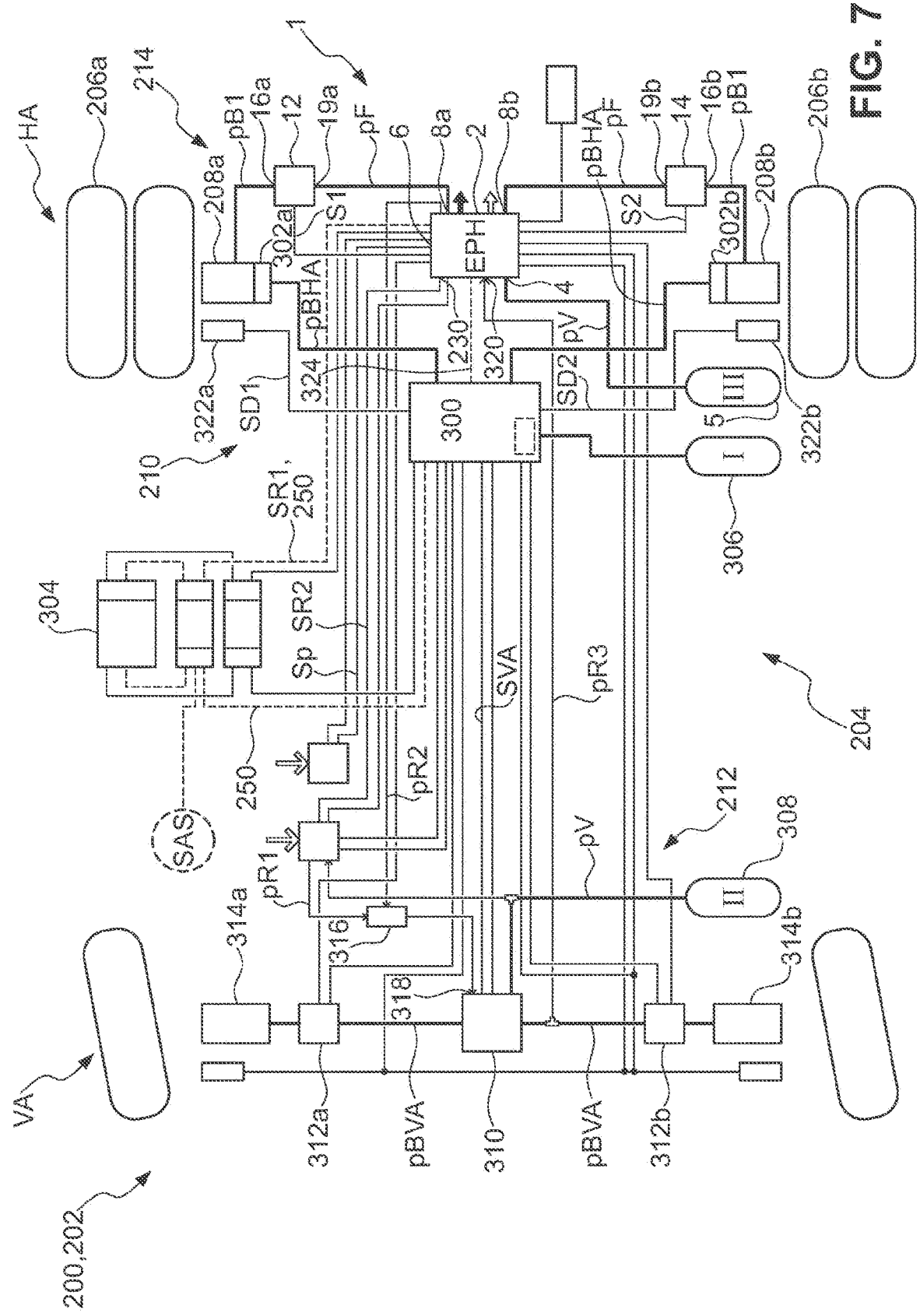
FIG. 7. shows a first exemplary embodiment of a braking system according to a second aspect.
Figure 8:
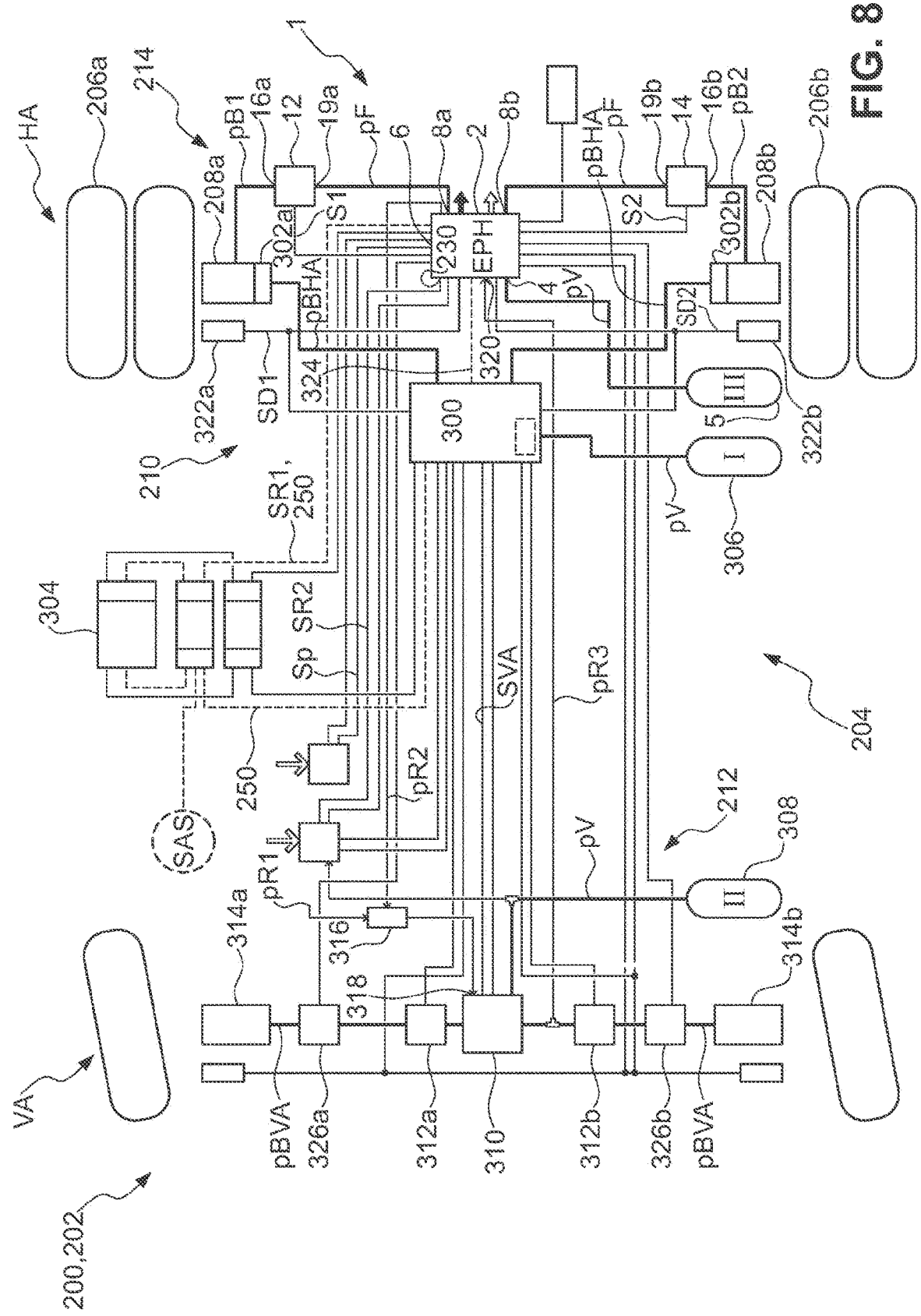
FIG. 8 shows a second exemplary embodiment of the braking system.
Figure 9:
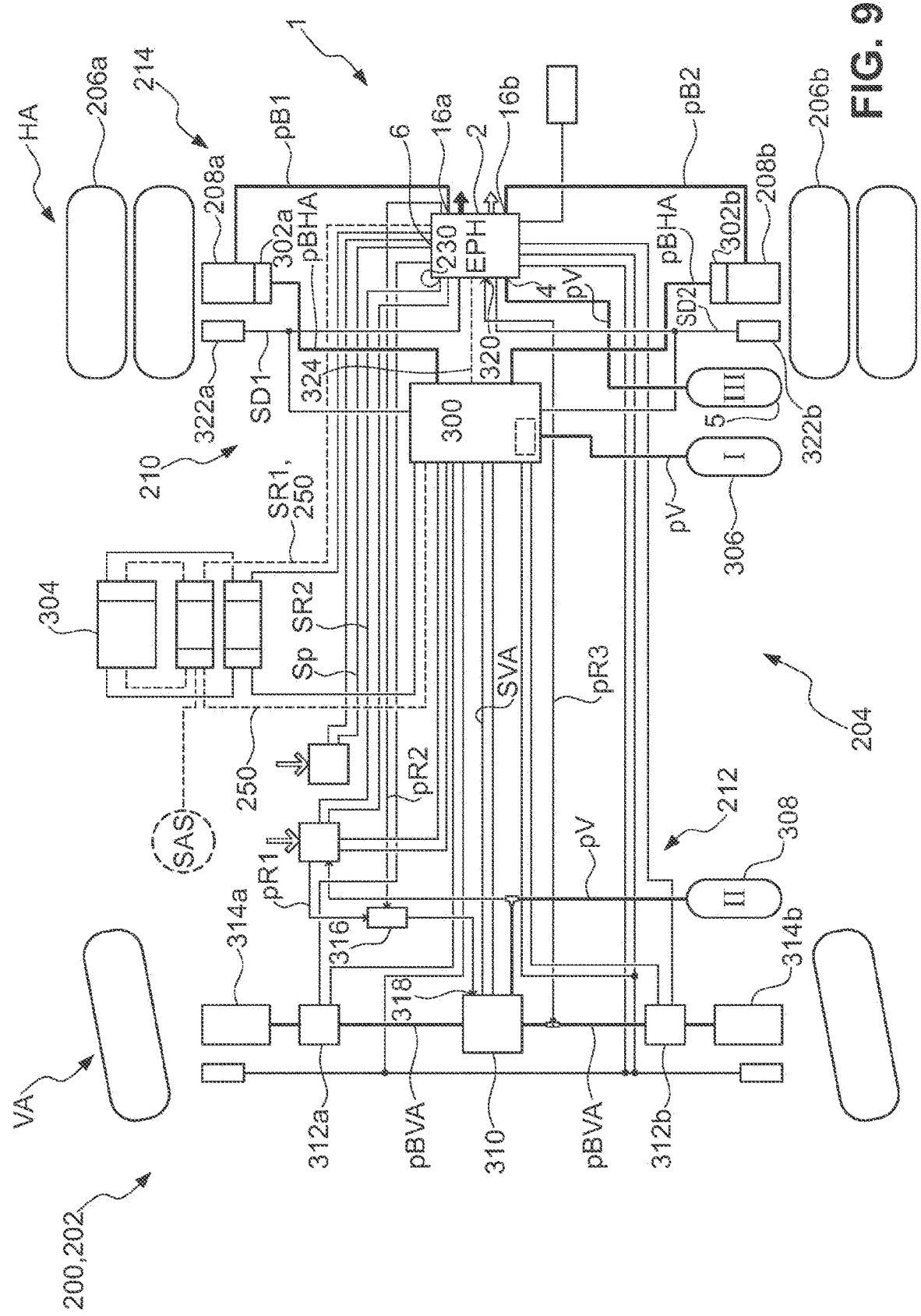
FIG. 9 shows a third exemplary embodiment of the braking system.

A parking brake assembly 1 (FIG. 1) is provided in an electronically controllable pneumatic braking system 204 (cf. FIG. 7-9). The parking brake assembly 1 has a parking brake unit 2, which for its part is intended to modulate a parking brake pressure pF. Such a parking brake pressure pF is usually provided at first and second spring-loaded brake cylinders 208*a*, 208*b*, in order to admit air to them, and consequently open them, in driving mode. If the vehicle 200 is to be parked, the parking brake pressure is reduced by the parking brake unit, preferably down to ambient pressure, as a result of which the spring-loaded brake cylinders 208*a*, 208*b* are applied.

For this purpose, the parking brake unit 2 is supplied by way of a supply connection 4 with supply pressure pV from a compressed air supply 5. Furthermore, the parking brake unit 2 has a brake request connection 6, for receiving a parking brake request pPBV, and a parking brake pressure connection 8, for providing the parking brake pressure pF.

In the assembly shown in FIG. 1, the parking brake unit 2 is designed as a purely pneumatic parking brake unit and has a relay valve 20. The parking brake request is in this case a pneumatic parking brake request pPBV, to be specific a pressure that is provided by a parking brake valve 9. The parking brake valve 9 is designed in a conventional way and on the one hand receives supply pressure pV and on the other hand, with corresponding switching, modulates the parking brake request pressure pPBV as control pressure at the parking brake request connection 6 of the parking brake unit 2, which in this case is designed as a pneumatic connection. Depending on the level of the parking brake request pPBV, the relay valve 20 of the parking brake unit 2 then in a corresponding way modulates the parking brake pressure pF at the parking brake pressure connection 8 in a volume-increased manner.

In critical driving situations, or else for the case where service brakes on a corresponding axle (here by way of example the rear axle HA) fail and the spring-loaded brake cylinders 208*a*, 208*b* are to this extent intended as redundant brakes for braking this corresponding axle, it is desirable to implement anti-lock protection.

For this purpose, according to the present embodiment, the parking brake pressure pF is not passed on directly to the first and second spring-loaded brake cylinders 208*a*, 208*b*, but rather a traction-slip-controlled modulation is performed. For this purpose, the parking brake assembly 1 has an ABS valve assembly 10, which receives the parking brake pressure pF and then provides it in a traction-slip-controlled manner as the first or second brake pressure pB1, pB2. In this exemplary embodiment, the ABS valve assembly 10 has a first ABS valve unit 12 and a second ABS valve unit 14. The first ABS valve unit 12 receives the parking brake pressure pF and provides the first brake pressure pB1 for at least the first spring-loaded brake cylinder 208*a* at at least a first channel 16*a*. In the exemplary embodiment shown in FIG. 1, the first channel 16*a* is connected to the first spring-loaded brake cylinder 208*a*. In a similar way, the second ABS valve unit 14 receives the parking brake pressure pF and provides the second brake pressure pB2 for at least the second spring-loaded brake cylinder 208*b* at a second channel 16*b*. In this exemplary embodiment, the second channel 16*b* is connected to the second spring-loaded brake cylinder 208*b*. It should be understood that the first and second channels 16*a*, 16*b* may also be connected to one or more spring-loaded brake cylinders or other consumers. In particular, it is not required that the first and second spring-loaded brake cylinders 208*a*, 208*b* are arranged on an axle, as shown in FIG. 1. For example, it is also conceivable that the second spring-loaded brake cylinder 208*b* is attached to a front axle, or vice versa.

In this exemplary embodiment (FIG. 1), the first and second ABS valve units 12, 14 are respectively connected by way of first and second parking brake pressure lines 18*a*, 18*b* to the parking brake pressure connection 8. For this purpose, the first and second parking brake pressure lines 18, 18*b* branch. The first parking brake pressure line 18*a* is connected to a first parking brake pressure input. The second parking brake pressure line 18*b* is connected to a second parking brake pressure input 19*b* of the second ABS valve unit 14.

It should be understood that, in other exemplary embodiments, a second parking brake pressure connection 8 may also be provided on the parking brake unit 2, so that the first and second ABS valve units are respectively connected to their own parking brake pressure connections. It is similarly possible that the first and second ABS valve units 12, 14 are directly integrated with the parking brake unit 2 and to this extent it is possible to dispense with the first and second parking brake pressure lines 18*a*, 18*b*.

The first and second ABS valve units 12, 14 are designed such that, in dependence on received first and second ABS signals S1, S2, they vary the received parking brake pressure pF so as to provide the corresponding first and second brake pressures pB1, pB2.

In the exemplary embodiment shown, the first and second ABS signals S1, S2 are provided by an ABS control unit 22. This ABS control unit 22 preferably receives data and signals from the wheel speed sensors at the axle to which the first and second spring-loaded brake cylinders 208*a*, 208*b* are assigned. In this way, the ABS control unit 22 is preferably designed for automatically carrying out the traction-slip control. In addition, it may be provided that the ABS control unit 22 has a redundancy connection 230, by way of which it is connected to a vehicle-BUS 250, in order to receive from the latter for example a redundancy signal SR, which indicates that the first and second spring-loaded brake cylinders 208*a*, 208*b* are used for redundant braking of the corresponding axle. By means of the redundancy signal SR, for example, the ABS control unit 22 can be activated. In addition, it is also conceivable that the ABS control unit 22 also obtains by way of the redundancy connection 230 signals from wheel speed sensors sent by way of the vehicle-BUS 250. In this case it is not necessary for the ABS control unit 22 to receive these signals automatically, for example by way of redundant direct cabling.

In the exemplary embodiment shown in FIG. 1, the first ABS valve unit 12 has a first ABS precontrol unit 30, for modulating a first and a second control pressure p1, p2, and also a first ABS main valve unit 34, which receives the corresponding first and second control pressures p1, p2. The second ABS valve unit 14 has in a corresponding way a second ABS precontrol unit 32, for modulating a third and a fourth control pressure p3, p4, and also a second ABS main valve unit 36, which receives the corresponding third and fourth control pressures p3, p4. Altogether, in this exemplary embodiment the first and second ABS valve units 12, 14 are designed identically in their layout.

Specifically, the first ABS precontrol unit 30 has a first inlet precontrol valve 40, which is designed for modulating the first control pressure p1. In the exemplary embodiment shown (FIG. 1), the first inlet precontrol valve 40 is designed as a 3/2-way valve and has a first inlet precontrol valve connection 40.1, a second inlet precontrol valve connection 40.2 and a third inlet precontrol valve connection 40.3. The first inlet precontrol valve connection 40.1 is connected to the first parking brake pressure input 19a and thus receives the parking brake pressure pF. The second inlet precontrol valve connection 40.2 is connected to the first ABS main valve unit 34, and the third inlet precontrol valve connection 40.3 is connected to an air extractor 7 of the first ABS valve unit 12. The first inlet precontrol valve 40 is without current in the first switching position, shown in FIG. 1, in which the second inlet precontrol valve connection 40.2 is connected to the third inlet precontrol valve connection 40.3, so that the second inlet precontrol valve connection 40.2 is connected to the air extractor 7. By providing the first ABS signal S1, the first inlet precontrol valve 40 switches from the first switching position, shown in FIG. 1, into the second switching position, not shown in FIG. 1, so that then the parking brake pressure pF present at the first parking pressure input 19a is allowed to pass through the first inlet precontrol valve 40 and is provided as the first control pressure p1 at the first ABS main valve unit 34. To be more precise, the first control pressure p1 is provided at a first pneumatically switchable inlet main valve 44 of the first ABS main valve unit 34. The first inlet main valve 44 is designed as a pneumatically switchable 2/2-way valve and has a first inlet main valve connection 44.1 and a second inlet main valve connection 44.2. The first inlet main valve connection 44.1 is in turn connected to the first parking brake pressure input 19a, so that the latter receives the parking brake pressure pF. The second inlet main valve connection 44.2 is connected to the first channel 16a, so that the latter can modulate the first brake pressure pB1. The first control pressure p1 is provided at a first control connection 44.3 of the first inlet main valve 44. As long as the first control pressure p1 remains below a first threshold value, the first inlet main valve 44 is in the open switching position, shown in FIG. 1. As soon as the first control pressure p1 goes above this first threshold value, the first inlet main valve 44 switches into the second switching position, not shown in FIG. 1, in which the first and second inlet main valve connections 44.1, 44.2 are disconnected. That is to say that, as long as the first control pressure p1 remains below the first threshold value, the parking brake pressure pF is allowed to pass through from the first parking brake pressure input 19a through the first inlet main valve 44 and is provided in the first channel 16a.

In addition to the first inlet precontrol valve 40, the first ABS precontrol unit 30 also has a first outlet precontrol valve 42. In a way similar to the first inlet precontrol valve 40, the first outlet precontrol valve 42 is designed as a 3/2-way valve and has a first outlet precontrol valve connection 42.1, a second outlet precontrol valve connection 42.2 and a third outlet precontrol valve connection 42.3. The first outlet precontrol valve connection 42.1 is connected to the air extractor 7. The second outlet precontrol valve connection 42.2 is connected to the first ABS main valve unit 34 and the third outlet precontrol valve connection 42.3 is connected to the first parking brake pressure input 19a, and consequently receives the parking brake pressure pF. In the first switching position, shown in FIG. 1, in which the second outlet precontrol valve connection 42.2 is connected to the third outlet precontrol valve connection 42.3, the first outlet precontrol valve 42 is without current, so that the parking brake pressure pF is provided as a second control pressure p2 by the second outlet precontrol valve connection 42.2 at the first ABS main valve unit 34.

To be more precise, the second control pressure p2 is provided at a first pneumatically switchable outlet main valve 46. The first outlet main valve 46 serves for extracting air from the first channel 16a. Like the first inlet main valve 44, it is designed as a pneumatically switchable 2/2-way valve and has a first outlet main valve connection 46.1, which is connected to the first channel 16a, and a second outlet main valve connection 46.2, which is connected to the air extractor 7. The second control pressure p2 is provided at a second control connection 46.3 of the first outlet main valve 46. The first outlet main valve 46 is formed such that, if the second control pressure p2 goes below a second threshold value, it is in an open switching position and, as soon as the second control pressure goes above the second threshold value, it switches into a closed switching position.

In an initial state, when no first ABS signal 51 is provided, and also no parking brake pressure pF has been modulated, the valves are in the switching position shown in FIG. 1. As soon as a parking brake pressure pF is then provided, this pressure is provided by way of the first outlet precontrol valve 42, so that the second control pressure p2 is modulated. As a consequence, the first outlet main valve 46 switches into the second, closed switching position, not shown in FIG. 1, so that the parking brake pressure pF can be allowed through from the first parking brake pressure input 19a into the first channel 16a. As a consequence, air is extracted from the first spring-loaded brake cylinder 208a.

In order then, as a departure from this, to achieve pulsed admission of air, the first inlet main valve 44 must be closed when the parking brake pressure pF is modulated, so that the parking brake pressure pF cannot be modulated directly at the first spring-loaded brake cylinder 208a, but only when the first inlet main valve 44 is opened. By corresponding provision of the first ABS signal 51, therefore, the first inlet precontrol valve 40 and the first outlet precontrol valve 42 can then be switched, so that as a consequence both the first parking brake pressure input 19a is shut off with respect to the first channel 16a, on the other hand the first channel 16a is connected by way of the first outlet main valve 46 to the air extractor 7, so that air is extracted from the first spring-loaded brake cylinder 208a and locking of the correspondingly assigned wheel is prevented.

The second ABS valve unit 14 is constructed identically to the first ABS valve unit 12 and has a second inlet precontrol valve 50, with a fourth inlet precontrol valve connection 50.1, a fifth inlet precontrol valve connection 50.2 and a sixth inlet precontrol valve connection 50.3. The fourth inlet precontrol valve connection 50.1 is connected to the second parking brake pressure input 19b and receives the parking brake pressure pF. The fifth inlet precontrol valve connection 50.2 is connected to the second ABS main valve unit 36, in this exemplary embodiment to be more precise to a second pneumatically switchable inlet main valve 54. The sixth inlet precontrol valve connection 50.3 is in turn connected to an air extractor 7. The second inlet main valve 54 is in turn designed as a 2/2-way valve and has a third inlet main valve connection 54.1, which is connected to the second parking brake pressure input 19b, and a fourth inlet main valve connection 54.2, which is connected to the second channel 16b. The pneumatically switchable second inlet main valve 54 additionally has a third control connection 54.3, at which the third control pressure p3 is modulated by the second inlet precontrol valve 50, as long as the latter is in the second switching position, not shown in FIG. 1.

Once again as corresponds to the first ABS valve unit 12, the second ABS valve unit 14 also has a second outlet precontrol valve 52, which in turn is designed as a 3/2-way valve. It has a fourth outlet precontrol valve connection 52.1, which in turn is connected to the air extractor 7, a fifth outlet precontrol valve connection 52.2, which is connected to the second ABS main valve unit 36, to be more precise to a second pneumatically switchable outlet main valve 56 for providing the fourth control pressure p4, and also a sixth outlet precontrol valve connection 52.3, which is connected to the second parking brake pressure input 19b. The second inlet precontrol valve 50 and the second outlet precontrol valve 52 are switched on the basis of the second ABS signal S2. Once again, by corresponding switching of these signals, the provided second brake pressure pB2 in the second channel 16b can be controlled to be below the parking brake pressure pF, in order to prevent locking of the second spring-loaded brake cylinder 208b.

Figure 2:
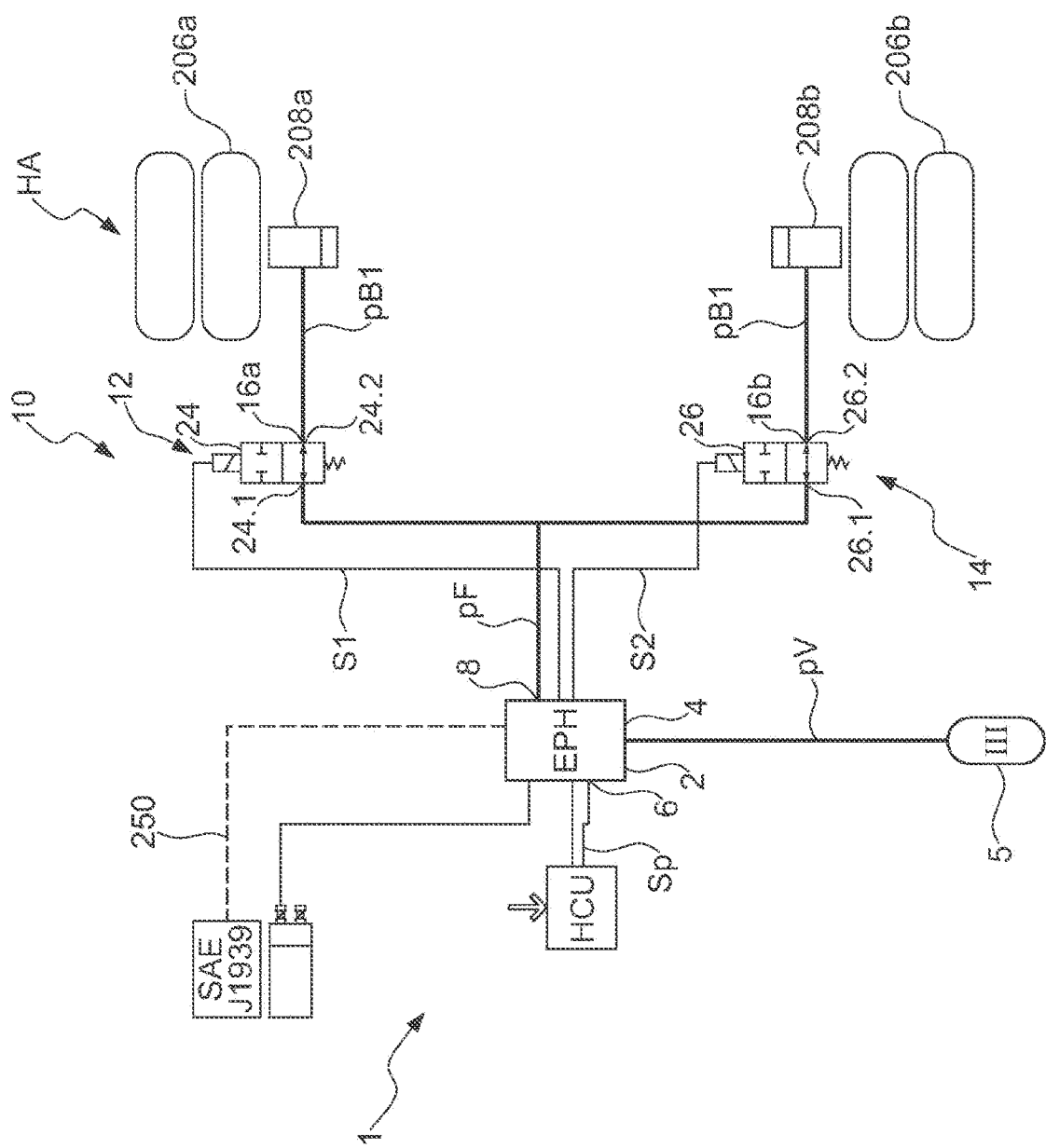
FIG. 2 shows a second exemplary embodiment of a parking brake assembly.

FIG. 2 then shows a simplified exemplary embodiment. Identical and similar elements are denoted by the same reference signs as in FIG. 1, and to this extent reference is made to the above description in full. The following focuses primarily on the differences from the first exemplary embodiment, while commonalities are not emphasized any further.

Figure 10:
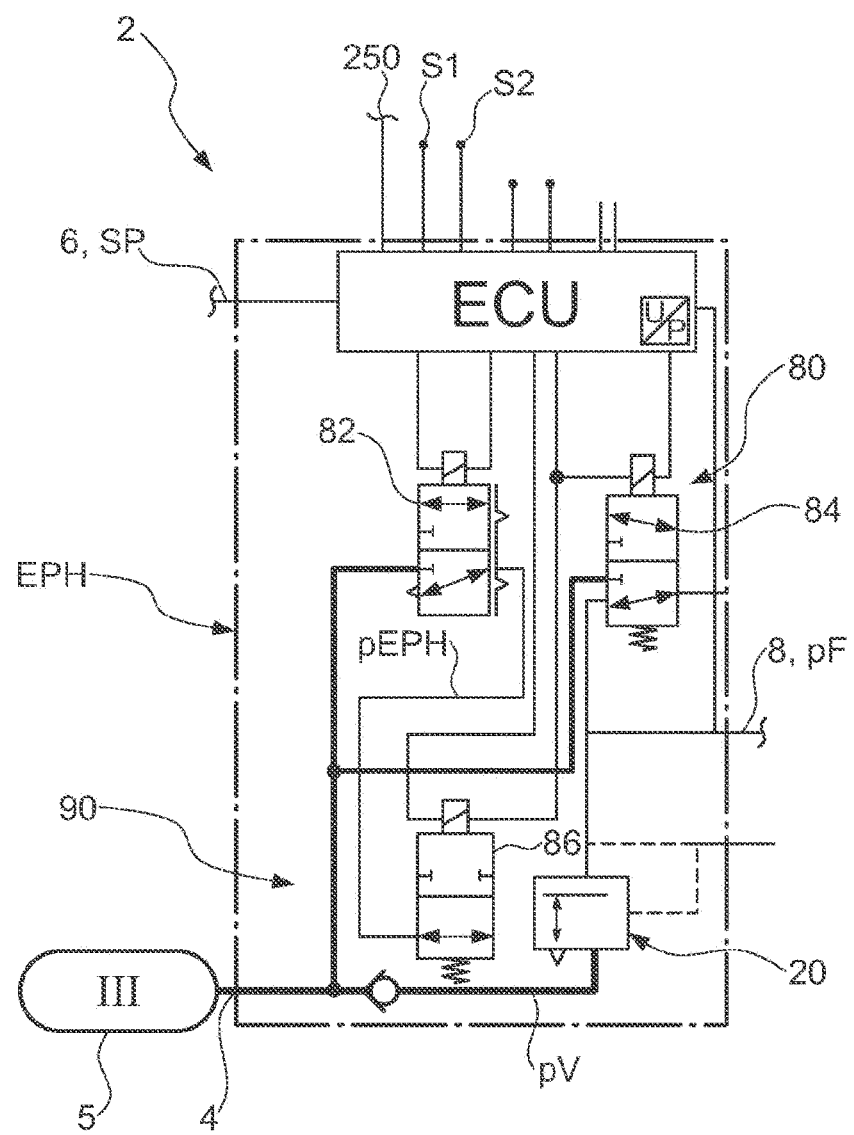
FIG. 10 shows a configuration, given by way of example, of a parking brake assembly.

A first difference from the first exemplary embodiment is that the parking brake unit 2 in the embodiment shown in FIG. 2, as an electropneumatic parking brake module EPH, is equipped with an EPH control unit ECU integrated therein, an EPH precontrol valve unit 80 (cf. FIG. 10) and an EPH main valve unit 90 (cf. FIG. 10). A possible variant of the parking brake module EPH is shown in FIG. 10. The parking brake module EPH shown there has an EPH control unit ECU and also an EPH precontrol valve unit 80 and an EPH main valve unit 90. The EPH precontrol valve unit has an inlet-outlet valve 82 and also a trailer control valve 84.

The inlet-outlet valve 82 is connected to the supply connection 4 and, in dependence on its switching position, provides an EPH control pressure pEPH by way of a shut-off valve 86 at the relay valve 20, which is arranged within the parking brake module EPH. The relay valve 20 similarly receives in a known way supply pressure pV from the supply connection 4 and modulates the parking brake pressure pF at the parking brake pressure connection 8. In this embodiment, the EPH control unit ECU has the brake request connection 6, at which a parking brake request SP is provided. In this case (cf. FIG. 2), the parking brake request SP is a parking brake signal SP, which is provided by a parking brake switch HCU. In addition, the parking brake module EPH is also connected to the vehicle-BUS 250. Finally, the EPH control unit ECU also provides the first and second ABS signals S1, S2 (cf. FIG. 2 and FIG. 10). In the exemplary embodiment shown in FIG. 2, the first and second ABS valve units 12, 14 only have first and second ABS switching valves. The first ABS switching valve 24 has a first ABS switching valve connection 24.1, which is connected to the parking brake pressure connection 8 of the parking brake module EPH. Furthermore, the first ABS switching valve 24 has a second ABS switching valve connection 24.2, which is connected to the first channel 16a. The second ABS switching valve 26 has in a corresponding way a third ABS switching valve connection 26.1, which is connected to the parking brake pressure connection 8, and also a fourth ABS switching valve connection 26.2, which is connected to the second channel 16b. The first and second ABS switching valves 24, 26 are without current in an open switching position, shown in FIG. 2. By providing the first and second ABS signals S1, S2, the first ABS switching valves 24, 26 can be brought into the second switching position, not shown in FIG. 2, in which the first and second ABS switching valves 24, 26 are closed. If the parking brake pressure pF is reduced by the parking brake module EPH, in order in the exemplary embodiment shown in FIG. 2 to brake the rear axle HA in a redundant or regular manner, the first and second ABS switching valves 24, 26 can be closed in stages, in order to avoid excessively quick extraction of air, and thus to implement traction-slip control.

Figure 3:
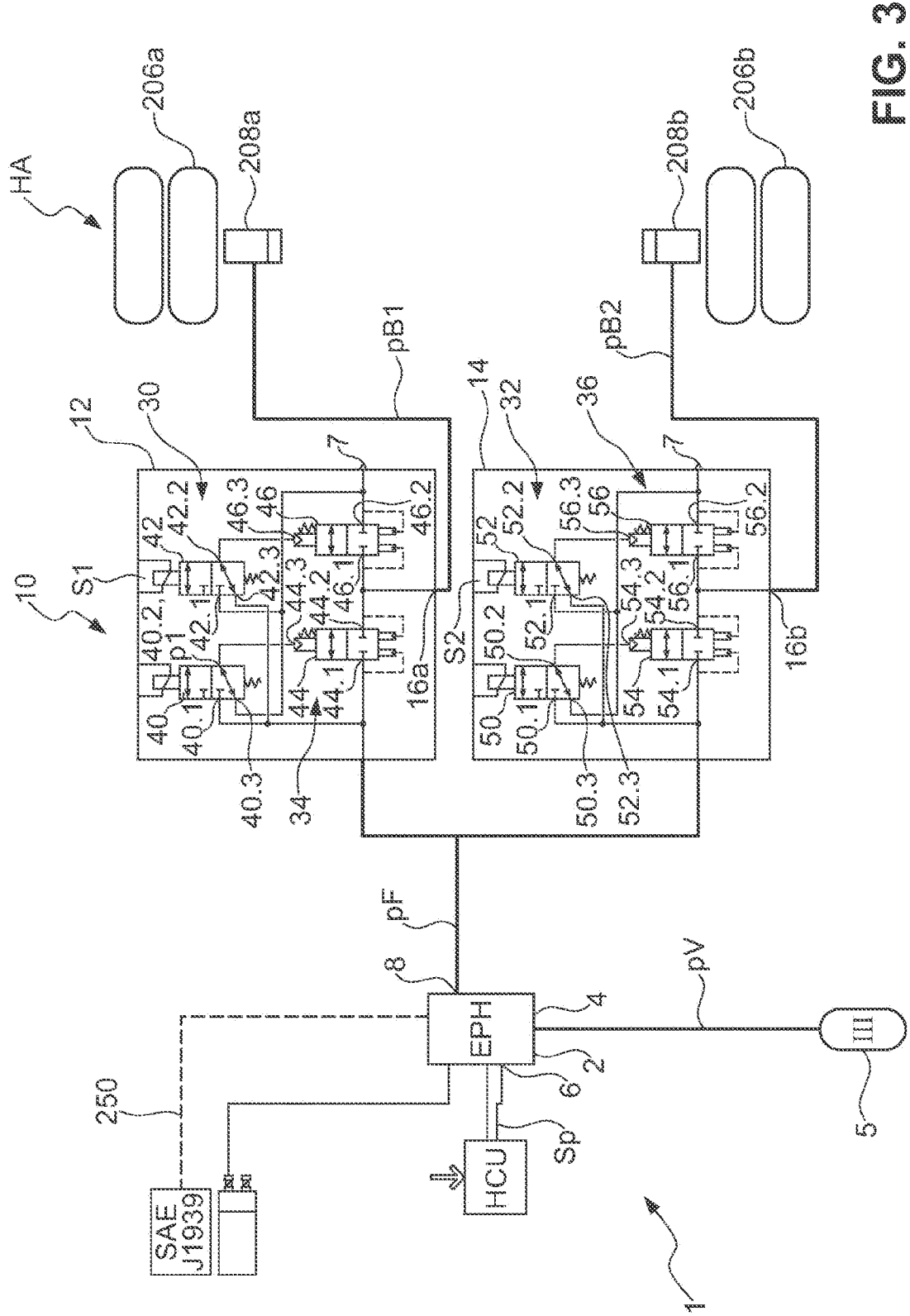
FIG. 3 shows a third exemplary embodiment of a parking brake assembly.

According to FIG. 3, a third exemplary embodiment of the parking brake assembly 1 is in turn based on the first exemplary embodiment according to FIG. 1. Identical and similar elements are provided with the same reference signs as in the first two exemplary embodiments, so that reference is made to the description above in full. The following focuses in particular on the differences from the first exemplary embodiment.

The first and second ABS valve units 12, 14 are designed substantially identically to the exemplary embodiment according to FIG. 1, while, as a departure from the exemplary embodiment represented in FIG. 1, the first and second ABS main valve units 34, 36 are closed without current.

The main difference in the third exemplary embodiment is in the design of the first and second pneumatically switchable inlet main valves 44, 54 and the first and second the switchable outlet main valves 46, 56. While in FIG. 1 these are prestressed in a spring-loaded manner into an open switching position (shown in FIG. 1), in the third exemplary embodiment these valves have pneumatic feedback, to be able to maintain a closed position when under pressure. Although these valves are also spring-loaded into the open switching position (not shown in FIG. 3), as soon as there is a pressure at one of the connections the corresponding valve is forced into the closed switching position (shown in FIG. 3), so that a holding position can be adopted.

In the fourth exemplary embodiment according to FIG. 4, once again identical and similar elements are provided with the same reference signs as in the first three exemplary embodiments, so that reference is made to the above description in full. In principle, the fourth exemplary embodiment (FIG. 4) is based on the third exemplary embodiment (FIG. 3), so that once again attention is substantially focused on the differences from the third exemplary embodiment.

A first difference in the fourth exemplary embodiment is that the first ABS valve unit 12 has a first ABS supply connection 58, for receiving the supply pressure pV, and the second ABS valve unit 14 has a second ABS supply connection 59, for receiving the supply pressure pV. In this exemplary embodiment, the supply pressure pV of the compressed air supply 5 is therefore not only fed to the parking brake unit 2, but in addition also separately and directly to the first and second ABS valve units 12, 14. It is intended in this way to achieve the effect that it is not just possible for air to be admitted to the first and second spring-loaded brake cylinders 208a, 208b up to the level of the parking brake pressure pF modulated by the parking brake unit 2, but also for air to be admitted to above this pressure.

In order to achieve this, the way in which the individual valves are connected up and the way in which they are arranged within the first and second ABS valve units 12, 14 are adapted.

The first and second ABS precontrol units 30, 32 are in the first instance likewise designed identically to the first and third exemplary embodiments. However, the first and second ABS main valve units 34, 36 differ.

The first ABS main valve unit 34 according to the fourth exemplary embodiment (FIG. 4) has a first pneumatically switchable EPH main valve 60, for modulating the parking brake pressure pF to the first channel 16a, and also a first pneumatically switchable supply main valve 62, for modulating the supply pressure pV to the first channel 16a. In a corresponding way, the second ABS main valve unit 36 has a second pneumatically switchable EPH main valve 64, for modulating the parking brake pressure pF to the second channel 16b, and also a second pneumatically switchable supply main valve 66, for modulating the supply pressure pV to the second channel 16b.

The first pneumatically switchable EPH main valve 60 has a first EPH main valve connection 60.1, which is connected to the first parking brake pressure input 19a and thus receives the parking brake pressure pF. Furthermore, the first EPH main valve 60 has a second EPH main valve connection 60.2, which is connected to the first channel 16a. Since the first EPH main valve 60 is designed as a pneumatically switchable valve, it has in addition a fifth control connection 60.3, which receives the first control pressure p1. The first EPH main valve 60 is designed such that, on account of the modulated parking brake pressure pF, it automatically switches into the open switching position, not shown in FIG. 4, and, by providing the first control pressure p1, it can be brought into a closed switching position, shown in FIG. 4. The first pneumatically switchable supply main valve 62 is likewise designed as a pneumatically switchable 2/2-way valve and has a first supply main valve connection 62.1, which is connected to the first channel 16a, and a second supply main valve connection 62.2, which is connected to the first ABS supply connection 58, and consequently receives the supply pressure pV. The first supply main valve 62 is also designed such that, on account of the supply pressure pV being provided, it automatically switches into the open switching position, not shown in FIG. 4, and, on the basis of the provision of the second control pressure p2 at a sixth control connection 62.3 of the first supply main valve 62, it can be switched into the first switching position, shown in FIG. 4, which is closed. In this way, for example, by providing the first control pressure p1, the first pneumatically switchable EPH main valve 60 can be closed, while the first pneumatically switchable supply main valve 62 remains open, and consequently the supply pressure pV can be modulated directly from the first ABS supply connection 58 by way of the first pneumatically switchable supply main valve 62 at the first channel 16a, in order to admit air to the corresponding assigned first spring-loaded brake cylinders 208a, and thereby release them. This admission of air may similarly take place in stages, by corresponding provision of the first ABS signal 51.

Figure 4:
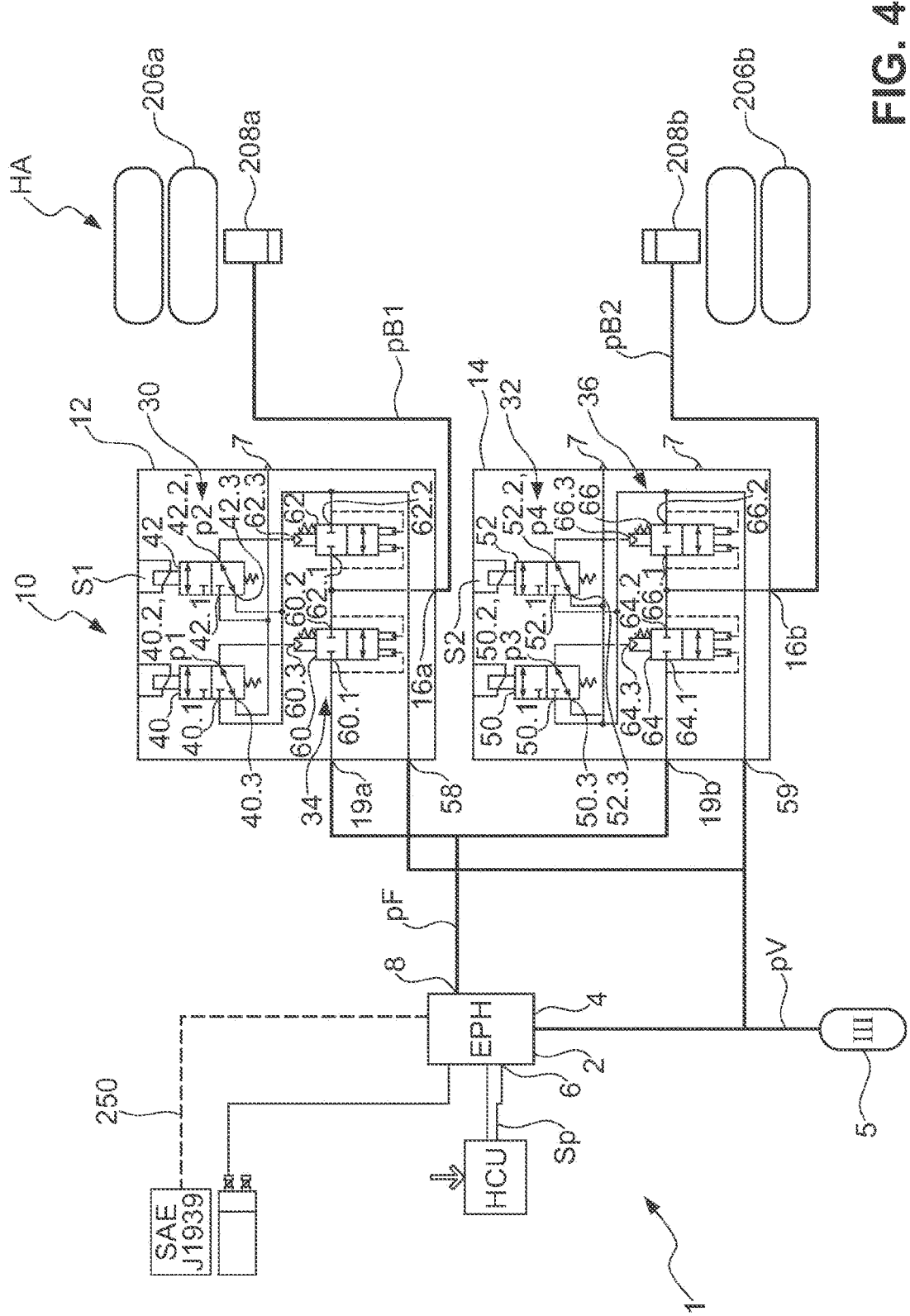
FIG. 4 shows a fourth exemplary embodiment of a parking brake assembly.

The second ABS valve unit 14 is designed in an identical way and has in the second ABS main valve unit 36 a second pneumatically switchable EPH main valve 64, with a third EPH main valve connection 64.1, which is connected to the second parking brake pressure input 19b, a fourth EPH main valve connection 64.2, which is connected to the second channel 16b, and a seventh control connection 64.3, which receives the third control pressure p3. Furthermore, according to this fourth exemplary embodiment (FIG. 4), the second ABS main valve unit 36 has a second pneumatically switchable supply main valve 66, which has a third supply main valve connection 66.1, which is connected to the second channel 16b, a fourth supply main valve connection 66.2, which is connected to the second ABS supply connection 59, and also an eighth control connection 66.3, which receives the fourth control pressure. The way in which the second ABS valve unit 14 operates is identical to the first ABS valve unit 12 according to this fourth exemplary embodiment (FIG. 4).

Figure 5:
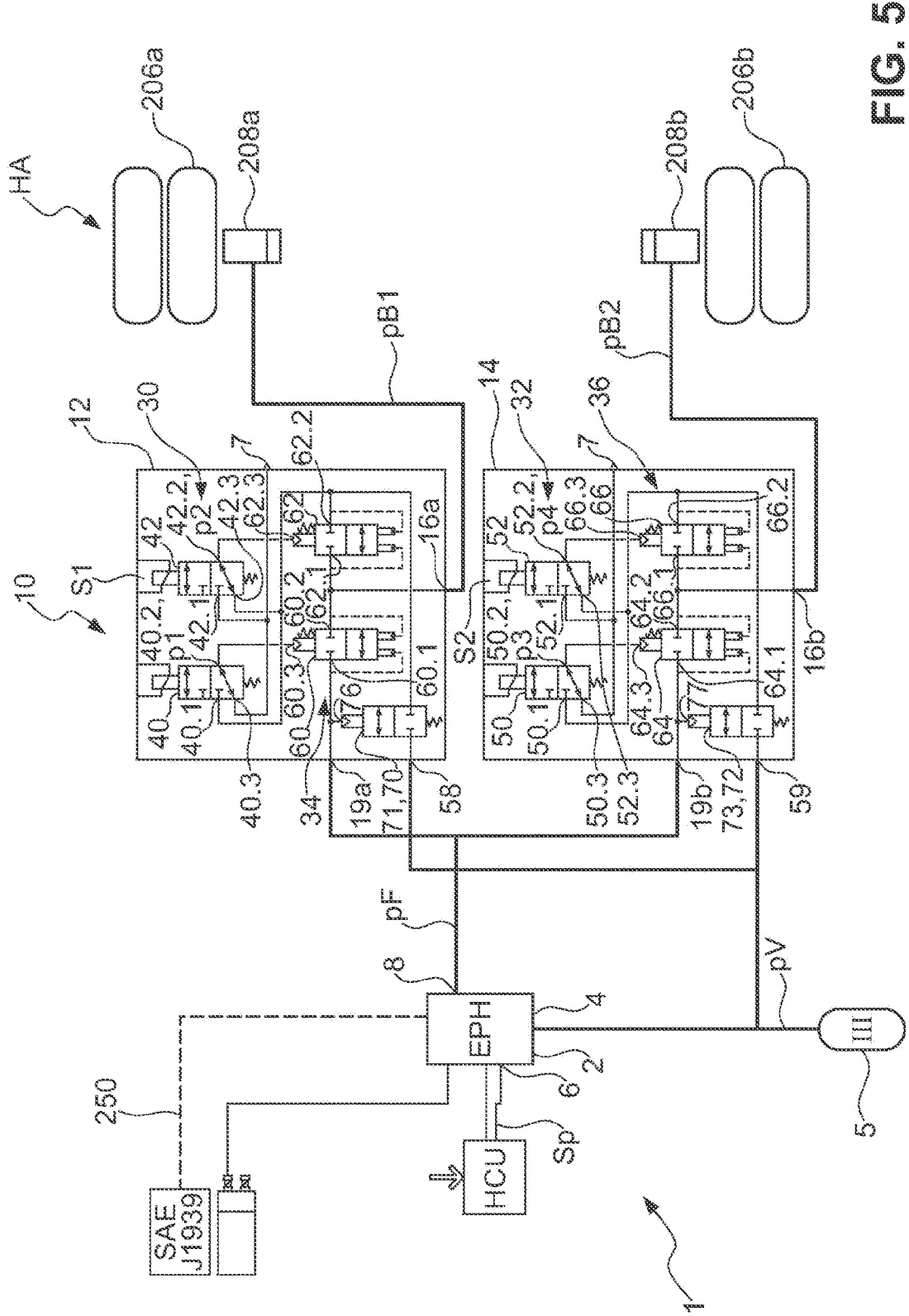
FIG. 5 shows a fifth exemplary embodiment of a parking brake assembly.

In the fifth exemplary embodiment, shown in FIG. 5, once again identical elements are provided with the same reference signs as in the previous exemplary embodiments, so that reference is made to the above description in full. The fifth exemplary embodiment according to FIG. 5 is based on the fourth exemplary embodiment according to FIG. 4, with the difference that first and second ABS shut-off valves 70, 72 are provided. Thus, the first ABS valve unit 12 has a first ABS shut-off valve 70, which is designed as a 2/2-way valve 71. It is fitted into the pneumatic line downstream of the corresponding first and second ABS supply connections 58, 59, so that the supply pressure pV can be excluded by means of the first and second ABS shut-off valves 70, 72. If the first and second ABS shut-off valves 70, 72 are in the first, open switching position, shown in FIG. 5, the supply pressure pV cannot be allowed to pass through by the first and second ABS valve units 12, 14, so that it is not possible for air to be admitted to the first and second spring-loaded brake cylinders 208a, 208b beyond the parking brake pressure pF provided. The first and second ABS shut-off valves 70, 72 respectively have a first and second shut-off control connection 76, 77, which respectively receive the parking brake pressure pF. For this purpose, the first and second shut-off control connections 76, 77 are connected to a pneumatic line, which runs from the first or second parking brake pressure input 19a, 19b to the first or second EPH main valve 60, 64. Therefore, as soon as the parking brake pressure pF goes above a predetermined threshold value, the first and second shut-off valves 70, 72 switch into the second, open switching position, not shown in FIG. 5, so that the supply pressure pV can be modulated at the first and second supply main valves 62, 66. In this way, in particular admission of air to the first and second spring-loaded brake cylinders 208a, 208b can be carried out more quickly, since, in addition to the parking brake pressure pF, supply pressure pV can also be used for admitting air to them.

Figure 6:
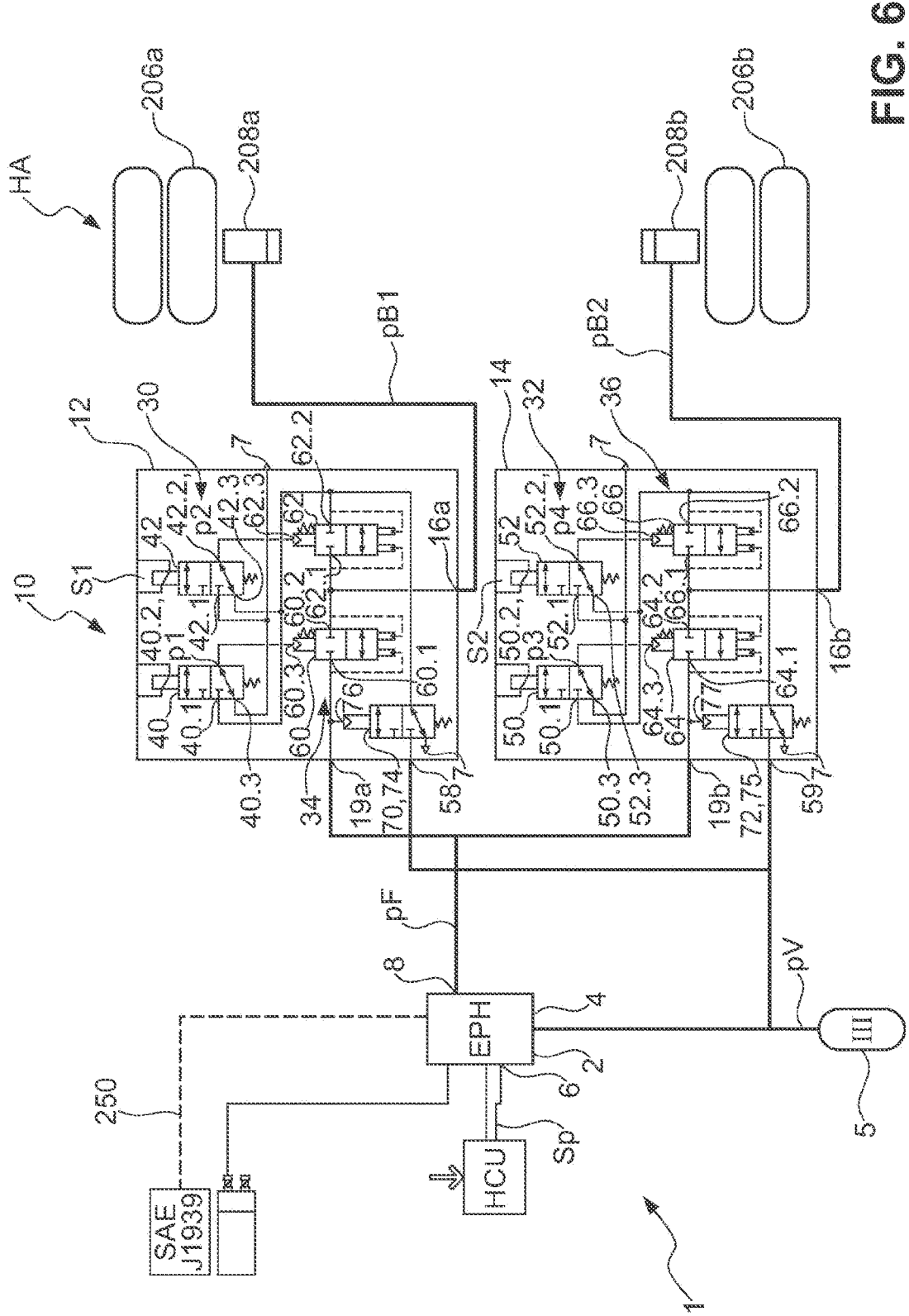
FIG. 6 shows a sixth exemplary embodiment of a parking brake assembly.

The sixth exemplary embodiment, shown in FIG. 6, is based on the fifth exemplary embodiment, shown in FIG. 5, while the following describes in particular the differences from the fifth exemplary embodiment. The only difference between the fifth exemplary embodiment (FIG. 5) and the sixth exemplary embodiment (FIG. 6) is that the first and second ABS shut-off valves 70, 72 are designed as first and second pneumatically switchable 3/2-way valves. The connection, additionally created as a result, at the first and second ABS shut-off valves 70, 72 is then connected in the exemplary embodiment to an air extractor 7, so that, in the first switching position, shown in FIG. 6, not only can no supply pressure pV be modulated at the first and second supply main valves 62, 66, but these valves are connected to the air extractor 7. In this way, air can also additionally be extracted from the spring-loaded brake cylinders 208a, 208b.

FIGS. 7 to 9 then show three different exemplary embodiments of an electronically controllable pneumatic braking system 204 for a vehicle 200, to be specific in particular a commercial vehicle 202.

Such an electronically controllable pneumatic braking system 204 has a rear axle brake circuit 210, a front axle brake circuit 212 and a parking brake circuit 214 (cf. FIG. 7). The parking brake circuit 214 is assigned here to the rear axle HA, but may similarly also be assigned to other axles, in particular additional axles. A parking brake assembly 1, which may be designed as described above, is provided in the rear axle brake circuit 214. It has in turn a parking brake unit 2, which is designed here as a parking brake module EPH and is connected to the first and second spring-loaded brake cylinders 208a, 208b at the rear axle HA. The first and second spring-loaded brake cylinders 208a, 208b are situated in so-called Tristop brake cylinders, which also comprise service brake cylinders 302a, 302b.

Identical and similar elements are once again denoted by the same reference signs as in the previous exemplary embodiments, so that reference is made to the above description in full.

A central module 300, which in this exemplary embodiment (FIG. 7) also assumes the function of a rear axle modulator, is provided for controlling the electronically controllable pneumatic braking system 204. The central module 300 is connected to the vehicle-BUS 250 and also by way of the latter to a unit for autonomous driving 304, from which the central module 300 receives brake request signals. In addition, the central module 300 is connected to a brake signal transmitter BST and to a first compressed air supply 306, for modulating rear axle brake pressures pBHA at the first and second service brake cylinders 302a, 302b at the rear axle HA. The first compressed air supply 306 is assigned to the rear axle brake circuit 210. The compressed air supply 5, assigned to the parking brake circuit 214, is in this exemplary embodiment a third compressed air supply.

The front axle brake circuit 212 is fed by a second compressed air supply 308. The front axle brake circuit 212 has a front axle modulator 310, which is connected to the second compressed air supply 308 and receives supply pressure pV from it. The front axle modulator 310 is connected by way of first and second front axle ABS units 312a, 312b to corresponding service brake cylinders 314a, 314b at the front axle VA, in order to modulate at them a front axle brake pressure pBVA in a traction-slip-controlled manner.

Furthermore, here the parking brake unit 2 is connected both to the parking brake switch HCU and to the brake signal transmitter BST, in order to receive brake request signals SP, SR2 from the latter. By way of the brake signal transmitter BST, the parking brake module 2 receives a second redundancy signal SR2, which is specifically described further below.

In normal driving mode, the central unit 300 receives from the unit for autonomous driving 304 brake request signals, which are then converted by the central module 300 directly into a rear axle brake pressure pBHA and into a front axle signal SVA, which is provided by the central module 300 at the front axle modulator 310, which in response modulates the front axle brake pressure pBVA.

For the case where such modulation is prevented, for example because the central module 300 has a defect, in this exemplary embodiment the parking brake unit 2 can take over the control of the braking system 204. For this purpose, the parking brake unit 2 then receives the second redundancy signal SR2 of the brake signal transmitter BST, that is to say for example of a foot brake pedal. This second redundancy signal SR2 is received by the parking brake unit 2 at the redundancy connection 230. The parking brake unit 2 then converts this signal into a parking brake pressure pF, which is provided at the parking brake pressure connection 8 (divided connections 8a, 8b in the embodiment shown in FIG. 7). At the same time, the parking brake unit 2, which is designed here as the parking brake module EPH, takes over the control of the first and second ABS valve units 12, 14, in order to provide the first and second brake pressure pB1, pB2 in a traction-slip-controlled manner at the first and second spring-loaded brake cylinders 208a, 208b, in order in this way to redundantly brake the rear axle HA.

In order also to redundantly brake the front axle, it is on the one hand possible to modulate a redundancy pressure pR1, modulated by the brake signal transmitter BST, by way of a select-high valve 316 at a redundancy connection 318 of the front axle modulator 310, or to modulate by the parking brake module EPH a second redundancy pressure pR2 by way of the select-high valve 316 to the redundancy connection 318 of the front axle modulator 310. That is to say that on the one hand a manual modulation may take place by way of the brake signal transmitter BST, on the other hand an automated modulation may also take place, by way of the parking brake module EPH.

In the event that the parking brake module EPH also fails, it is also possible in this embodiment to tap the front axle brake pressure pBVA modulated by the front axle modulator 310 on a further redundancy level and provided it as a third redundancy pressure pR3 at a redundancy connection 320 of the parking brake module EPH, in order in this way also to redundantly brake the rear axle HA.

In order to implement traction-slip control at the rear axle HA by means of the first and second ABS valve units 12, 14, first and second wheel speed sensors 322a, 322b are provided at the rear axle HA. In the exemplary embodiment shown (FIG. 7), these sensors are only connected to the central module 300. The latter receives wheel speed signals SD1, SD2 from the first and second wheel speed sensors 322a, 322b. The central module 300 and the parking brake unit EPH are connected by means of a direct BUS connection 324, so that the central module 300 can provide in the parking brake unit EPH corresponding wheel speed signals SD1, SD2, so that the parking brake unit EPH can then control the first and second ABS valve units 12, 14, in particular by providing the first and second ABS signals S1, S2.

The exemplary embodiment of the braking system 204 shown in FIG. 8 is substantially based on the exemplary embodiment shown in FIG. 7, the following focusing in particular on the differences. The first difference from the exemplary embodiment according to FIG. 7 is that the first and second wheel speed sensors 322a, 322b at the rear axle HA are not only connected to the central module 300, but by way of further cabling to the parking brake module EPH. In this way, the parking brake module EPH can obtain the first and second speed signals SD1, SD2 directly from the first and second wheel speed sensors 322a, 322b, in order then in the case of a defect of the central module 300 to achieve redundant traction-slip-controlled braking of the rear axle HA.

A further difference is that, in addition to the first and second front axle ABS units 312a, 312b, first and second redundant front axle ABS units 326a, 326b are provided at the front axle VA. These redundant units are arranged there in order to be able to also implement traction-slip control in redundant braking of the front axle VA. While in the case of the exemplary embodiment according to FIG. 7 the first and second front axle ABS units 312a, 312b are connected both to the central module 300 and to the parking brake module EPH by way of corresponding first and second cablings, and can thus be controlled by these modules, in the exemplary embodiment according to FIG. 8 the ABS units of the front axle are designed altogether in a redundant manner, so that in the case of redundancy the first and second front axle ABS units 312a, 312b become ineffective and the traction-slip control takes place by way of the first and second redundant front axle ABS units 326a, 326b, which receive corresponding signals from the parking brake module EPH.

The third exemplary embodiment of a braking system 204 shown in FIG. 9 is based both on the first and the second exemplary embodiment (FIGS. 7 and 8). The front axle VA in the third exemplary embodiment (FIG. 9) is designed substantially in a way corresponding to the front axle VA in the first exemplary embodiment (FIG. 7).

An essential difference in the third exemplary embodiment (FIG. 9) is that the first and second ABS valve units 12, 14 are integrated in the parking brake module EPH. The cabling of the first and second wheel speed sensors 322*a*, 322*b* at the rear axle HA is designed in a way corresponding to the second exemplary embodiment (FIG. 8).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Parking brake assembly
2 Parking brake unit
4 Supply connection
5 Compressed air supply
6 Brake request connection
8 Parking brake pressure connection
10 ABS valve assembly
12 First ABS valve unit
14 Second ABS valve unit
16*a* First channel
16*b* Second channel
18*a* First parking brake pressure line
18*b* Second parking brake pressure line
19*a* First parking brake pressure input
19*b* Second parking brake pressure input
20 Relay valve
22 ABS control unit
24 First ABS switching valve
24.1 First ABS switching valve connection
24.2 Second ABS switching valve connection
26 Second ABS switching valve
26.1 Third ABS switching valve connection
26.2 Fourth ABS switching valve connection
30 First ABS precontrol unit
32 Second ABS precontrol unit
34 First ABS main valve unit
36 Second ABS main valve unit
40 First inlet precontrol valve
40.1 First Inlet precontrol valve connection
40.2 Second inlet precontrol valve connection
40.3 Third inlet precontrol valve connection
42 First outlet precontrol valve
42.1 First outlet precontrol valve connection
42.2 Second outlet precontrol valve connection
42.3 Third outlet precontrol valve connection
44 First pneumatically switchable inlet main valve
44.1 First inlet main valve connection
44.2 Second inlet main valve connection
44.3 First control connection
46 First pneumatically switchable outlet main valve
46.1 First outlet main valve connection
46.2 Second outlet main valve connection
46.3 Second control connection
50 Second inlet precontrol valve
50.1 Fourth inlet precontrol valve connection
50.2 Fifth inlet precontrol valve connection
50.3 Sixth inlet precontrol valve connection
52 Second outlet precontrol valve
52.1 Fourth outlet precontrol valve connection
52.2 Fifth outlet precontrol valve connection
52.3 Sixth outlet precontrol valve connection
54 Second pneumatically switchable inlet main valve
54.1 Third inlet main valve connection
54.2 Fourth inlet main valve connection
54.3 Third control connection
56 Second pneumatically switchable outlet main valve
56.1 Third outlet main valve connection
56.2 Fourth outlet main valve connection
56.3 Fourth control connection
58 First ABS supply connection
59 Second ABS supply connection
60 First pneumatically switchable EPH main valve
60.1 First EPH main valve connection
60.2 Second EPH main valve connection
60.3 Fifth control connection
62 First pneumatically switchable supply main valve
62.1 First supply main valve connection
62.2 Second supply main valve connection
62.3 Sixth control connection
64 Second pneumatically switchable EPH main valve
64.1 Third EPH main valve connection
64.2 Fourth EPH main valve connection
64.3 Seventh control connection
66 The second pneumatically switchable supply main valve
66.1 Third supply main valve connection
66.2 Fourth supply main valve connection
66.3 Eighth control connection
70 First ABS shut-off valve
71 First 2/2-way valve
72 Second ABS shut-off valve
73 Second 2/2-way valve
74 First 3/2-way valve
75 Second 3/2-way valves
76 First shut-off control connection
77 Second shut-off control connection
80 EPH precontrol valve unit
82 Inlet-outlet valve
84 Trailer control valve 86 Shut-off valve
90 EPH main valve unit
200 Vehicle
202 Commercial vehicle
204 Electronically controlled pneumatic braking system
206a First wheel
206b Second wheel
208a First spring-loaded brake cylinder
208b Second spring-loaded brake cylinder
210 Rear axle brake circuit
212 Front axle brake circuit
214 Parking brake circuit
230 Redundancy connection
250 Vehicle-BUS
300 Central module
302a First service brake cylinder, rear axle
302b Second service brake cylinder, rear axle
304 Unit for autonomous driving
306 First compressed air supply
308 Second compressed air supply
310 Front axle modulator
312a First front axle ABS unit
312b Second front axle ABS unit
314a First service brake cylinder, front axle
314b Second service brake cylinder, front axle
316 Select-high valve
318 Redundancy connection, front axle modulator
320 Redundancy connection, EPH
322a First wheel speed sensor, rear axle
322b Second wheel speed sensor, rear axle
324 Direct BUS connection
326a First redundant front axle ABS unit
326b Second redundant front axle ABS unit
BST Brake signal transmitter
ECU EPH control unit
EPH Parking brake module
HA Rear axle
HCU Parking brake switch
p1 First control pressure
p2 Second control pressure
p3 Third control pressure
p4 Fourth control pressure
pEPH EPH control pressure
pF Parking brake pressure
pV Supply pressure
pPBV Pneumatic parking brake request
pB1 First brake pressure
pB2 Second brake pressure
pBHA Rear axle brake pressure
pBVA Front axle brake pressure
pR1 First redundancy pressure
pR2 Second redundancy pressure
pR3 Third redundancy pressure
First ABS signal
S2 Second ABS signal
SR Redundancy signal
SP Parking brake request (electronic)
SR2 Second redundancy signal
SD1 First wheel speed signal
SD2 Second wheel speed signal
SVA Front axle signal
VA Front axle

The invention claimed is:

1. A parking brake assembly for an electronically controllable pneumatic braking system for a vehicle, the parking brake assembly comprising:

a parking brake unit having a supply connection configured to receive a supply pressure, a brake request connection configured to receive a parking brake request, and a parking brake pressure connection configured to provide a parking brake pressure, and an ABS valve assembly having a first ABS valve unit for a first channel and a second ABS valve unit for a second channel, wherein the first ABS valve unit is configured to receive the parking brake pressure and to provide a first brake pressure for at least one first spring-loaded brake cylinder at the first channel, wherein the first ABS valve unit is designed to admit air to the first channel, in stages, in dependence on a received first ABS signal, wherein the second ABS valve unit is configured to receive the parking brake pressure and to provide a second brake pressure for at least one second spring-loaded brake cylinder at the second channel, wherein the second ABS valve unit is designed to admit air to the second channel, in stages, in dependence on a received second ABS signal, wherein the first ABS valve unit has a first ABS precontrol unit and a first ABS main valve unit, the first ABS precontrol unit being configured to modulate a first control pressure and a second control pressure, wherein the second ABS valve unit has a second ABS precontrol unit and a second ABS main valve unit, the second ABS precontrol unit being configured to modulate a third control pressure and a fourth control pressure, wherein the first ABS precontrol unit has a first inlet precontrol valve configured to modulate the first control pressure, and a first outlet precontrol valve configured to modulate the second control pressure, and wherein the second ABS precontrol unit has a second inlet precontrol valve configured to modulate the third control pressure, and a second outlet precontrol valve configured to modulate the fourth control pressure.

2. The parking brake assembly as claimed in claim 1, wherein the parking brake unit has a relay valve configured to receive the supply pressure and a parking brake control pressure, wherein the relay valve is configured to modulate the parking brake pressure at the parking brake pressure connection in dependence on the parking brake control pressure.

3. The parking brake assembly as claimed in claim 1, further comprising an ABS control unit configured to provide the first and second ABS signals at the first and second ABS valve units.

4. The parking brake assembly as claimed in claim 1, wherein the parking brake unit is designed as an electropneumatic parking brake module (EPH) with an EPH control unit integrated therein, an EPH precontrol valve unit and an EPH main valve unit.

5. The parking brake assembly as claimed in claim 4, wherein the EPH control unit provides the first and second ABS signal at the first and second ABS valve units.

6. The parking brake assembly as claimed in claim 1, wherein the first ABS valve unit has a first ABS switching valve and the second ABS valve unit has a second ABS switching valve.

7. The parking brake assembly as claimed in claim 6, wherein the first ABS switching valve has a first ABS switching valve connection configured to receive the parking brake pressure, and a second ABS switching valve connection configured to modulate the first brake pressure, and the second ABS switching valve has a third ABS switching valve connection configured to receive the parking brake pressure, and a fourth ABS switching valve connection configured to modulate the second brake pressure, wherein both the first and the second ABS switching valves are without current in an open switching position.

8. The parking brake assembly as claimed in claim 1, wherein the first ABS main valve unit has a first pneumatically switchable inlet main valve configured to admit air to the first channel, and a first pneumatically switchable outlet main valve configured to extract air from the first channel, wherein the first pneumatically switchable inlet main valve has a first control connection configured to receive the first control pressure, and the first pneumatically switchable outlet main valve has a second control connection configured to receive the second control pressure; and the second ABS main valve unit has a second pneumatically switchable inlet main valve configured to admit air to the second channel, and a second pneumatically switchable outlet main valve configured to extract air from the second channel, wherein the second pneumatically switchable inlet main valve has a third control connection configured to receive the third control pressure, and the second pneumatically switchable outlet main valve has a fourth control connection configured to receive the fourth control pressure.

9. The parking brake assembly as claimed in claim 1, wherein the first ABS main valve unit has a first pneumatically switchable EPH main valve configured to modulate the parking brake pressure at the first channel, and a first pneumatically switchable supply main valve configured to modulate the supply pressure at the first channel, wherein the first pneumatically switchable EPH main valve has a fifth control connection configured to receive the first control pressure, and the first pneumatically switchable supply main valve has a sixth control connection configured to receive the second control pressure; and the second ABS main valve unit has a second pneumatically switchable EPH main valve configured to modulate the parking brake pressure at the second channel, and a second pneumatically switchable supply main valve configured to modulate the supply pressure at the second channel, wherein the second pneumatically switchable EPH main valve has a seventh control connection configured to receive the third control pressure, and the second pneumatically switchable supply main valve has an eighth control connection configured to receive the fourth control pressure.

10. The parking brake assembly as claimed in claim 9, wherein the first ABS valve unit has a first ABS supply connection configured to receive the supply pressure, and the second ABS valve unit has a second ABS supply connection configured to receive the supply pressure.

11. The parking brake assembly as claimed in claim 10, wherein the first ABS valve unit has a first ABS shut-off valve configured to shut off the first ABS supply connection, and the second ABS valve unit has a second ABS shut-off valve configured to shut off the second ABS supply connection.

12. The parking brake assembly as claimed in claim 11, wherein the first ABS shut-off valve and the second ABS shut-off valve are designed as pneumatically switchable 2/2-way valves.

13. The parking brake assembly as claimed in claim 11, wherein the first ABS shut-off valve and the second ABS shut-off valve are designed as pneumatically switchable 3/2-way valves, which allow extraction of air from the first or second channel by way of the respective supply main valve.

14. The parking brake assembly as claimed in claim 1 wherein the first and second ABS valve units are arranged separately and at a distance from the parking brake unit.

15. The parking brake assembly as claimed in claim 1, wherein the first and second ABS valve units are flange-mounted on a housing of the parking brake unit.

16. The parking brake assembly as claimed in claim 1 wherein the first and second ABS valve units and the parking brake unit are integrated in a module.

17. An electronically controllable pneumatic braking system for a vehicle, comprising:
a rear axle brake circuit,
a front axle brake circuit, and
a parking brake circuit,
wherein the parking brake circuit has first and second spring-loaded brake cylinders and a parking brake assembly as claimed in claim 1, and
wherein the first channel is connected to the first spring-loaded brake cylinder and the second channel is connected to the second spring-loaded brake cylinder.

18. The electronically controllable pneumatic braking system as claimed in claim 17, wherein the parking brake assembly further comprises an ABS control unit configured to provide the first and second ABS signals at the first and second ABS valve units, and the ABS control unit has at least one first electronic redundancy connection configured to receive a first redundant electronic brake request signal.

19. A method for controlling an electronically controllable pneumatic braking system for a vehicle, the electronically controllable pneumatic braking system comprising a rear axle brake circuit, a front axle brake circuit, and a parking brake circuit,
wherein the parking brake circuit has first and second spring-loaded brake cylinders and a parking brake assembly comprising:
a parking brake unit having a supply connection configured to receive a supply pressure, a brake request connection configured to receive a parking brake request, and a parking brake pressure connection configured to provide a parking brake pressure, and
an ABS valve assembly having a first ABS valve unit for a first channel and a second ABS valve unit for a second channel,
wherein the first ABS valve unit is configured to receive the parking brake pressure and to provide a first brake pressure for at least one first spring-loaded brake cylinder at the first channel,
wherein the first ABS valve unit is designed to admit air to the first channel, in stages, in dependence on a received first ABS signal,
wherein the second ABS valve unit is configured to receive the parking brake pressure and to provide a second brake pressure for at least one second spring-loaded brake cylinder at the second channel, and
wherein the second ABS valve unit is designed to admit air to the second channel, in stages, in dependence on a received second ABS signal, and
wherein the first channel is connected to the first spring-loaded brake cylinder and the second channel is connected to the second spring-loaded brake cylinder, the method comprising:
providing a first brake pressure and a second brake pressure at the first and second spring-loaded brake cylinders of an axle in order to release the first and second spring-loaded brake cylinders;

ascertaining a fault, which at least partially prevents electronically controlled braking of the axle via service brake cylinders;

providing a redundant electronic brake request signal at the parking brake assembly; and implementing the redundant electronic brake request signal in a traction-slip-controlled manner for each individual wheel via the parking brake assembly at the axle at least by staged extraction of air in a traction-slip-controlled manner from the first and second spring-loaded brake cylinders.

20. A commercial vehicle, comprising:
a parking brake assembly as claimed in claim 1.

* * * * *